United States Patent
Baik et al.

(10) Patent No.: US 10,869,183 B2
(45) Date of Patent: Dec. 15, 2020

(54) METHOD AND APPARATUS FOR SEARCHING FOR DEVICE BY USING BLUETOOTH LOW ENERGY (LE) TECHNOLOGY

(71) Applicant: LG ELECTRONICS INC., Seoul (KR)

(72) Inventors: Jonghyun Baik, Seoul (KR); Younghwan Kwon, Seoul (KR); Taeyoung Song, Seoul (KR); Minsoo Lee, Seoul (KR); Jingu Choi, Seoul (KR); Jonghun Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/495,056

(22) PCT Filed: Mar. 19, 2018

(86) PCT No.: PCT/KR2018/003186
§ 371 (c)(1),
(2) Date: Sep. 17, 2019

(87) PCT Pub. No.: WO2018/169379
PCT Pub. Date: Sep. 20, 2018

(65) Prior Publication Data
US 2020/0100090 A1    Mar. 26, 2020

Related U.S. Application Data

(60) Provisional application No. 62/472,604, filed on Mar. 17, 2017, provisional application No. 62/488,068, (Continued)

(51) Int. Cl.
*H04B 7/00* (2006.01)
*H04W 4/80* (2018.01)
(Continued)

(52) U.S. Cl.
CPC .............. *H04W 8/005* (2013.01); *H04W 4/80* (2018.02); *H04W 12/06* (2013.01); *H04W 76/14* (2018.02)

(58) Field of Classification Search
CPC ......... H04W 4/06; H04W 4/80; H04W 8/005; H04W 12/003; H04W 40/24;
(Continued)

(56) References Cited

U.S. PATENT DOCUMENTS 9,794,934 B2 * 10/2017 Zhang ............... H04W 72/0446
10,111,071 B2 * 10/2018 Polo ...................... H04W 88/04
(Continued)

FOREIGN PATENT DOCUMENTS

KR    10-2015-0105580 A    9/2015
KR    10-2017-0006139 A    1/2017

OTHER PUBLICATIONS

Prithviraj Narendra "Comparison of Link Layer of BLE and 802.15.4", KTH Royal Institute of Technology, Information and Communication Technology, Stockholm, Svveden, 2014, total 75 pages.

*Primary Examiner* — Quochien B Vuong
(74) *Attorney, Agent, or Firm* — Birch, Stewart, Kolasch & Birch, LLP

(57) ABSTRACT

Disclosed herein are a method and apparatus for discovering an adjacent device in a wireless communication system using Bluetooth low energy (LE). In particular, the method performed by a first device includes recognizing an advertising channel in which interference exists among three advertising channels constituting a first advertising channel set, transmitting a control message instructing application of a protected mode to a second device, when the advertising channel in which interference exists is recognized, the protected mode indicating a mode for transmitting and receiving a message using a second advertising channel set updated from the first advertising channel set in a non-
(Continued)

connection state, and receiving an advertisement message from the second device through the second advertising channel set.

15 Claims, 36 Drawing Sheets

Related U.S. Application Data filed on Apr. 21, 2017, provisional application No. 62/507,743, filed on May 17, 2017.

(51) Int. Cl.
*H04W 8/00* (2009.01)
*H04W 76/14* (2018.01)
*H04W 12/06* (2009.01)

(58) Field of Classification Search
CPC ............ H04W 40/246; H04W 40/248; H04W 52/0209; H04W 76/10; H04W 84/18; H04W 88/02; H04W 92/18; H04B 1/04; H04B 1/0475; H04B 1/10; H04B 1/406; H04M 1/7253; H04M 11/00; H04M 2250/02

See application file for complete search history.

(56) References Cited

U.S. PATENT DOCUMENTS

| | | | | |
|---|---|---|---|---|
| 10,291,755 | B2* | 5/2019 | Knaappila | H04W 4/80 |
| 10,306,451 | B2* | 5/2019 | Takeuchi | H04W 8/005 |
| 10,484,932 | B2* | 11/2019 | Bloechl | H04W 48/10 |
| 10,587,302 | B2* | 3/2020 | Medapalli | H04B 1/40 |
| 2010/0120362 | A1 | 5/2010 | Walley et al. | |
| 2013/0003630 | A1* | 1/2013 | Xhafa | H04W 52/0229 370/311 |
| 2016/0359925 | A1 | 12/2016 | Song | |
| 2017/0245204 | A1* | 8/2017 | Kumar | H04W 52/0238 |

\* cited by examiner

[FIG. 1]
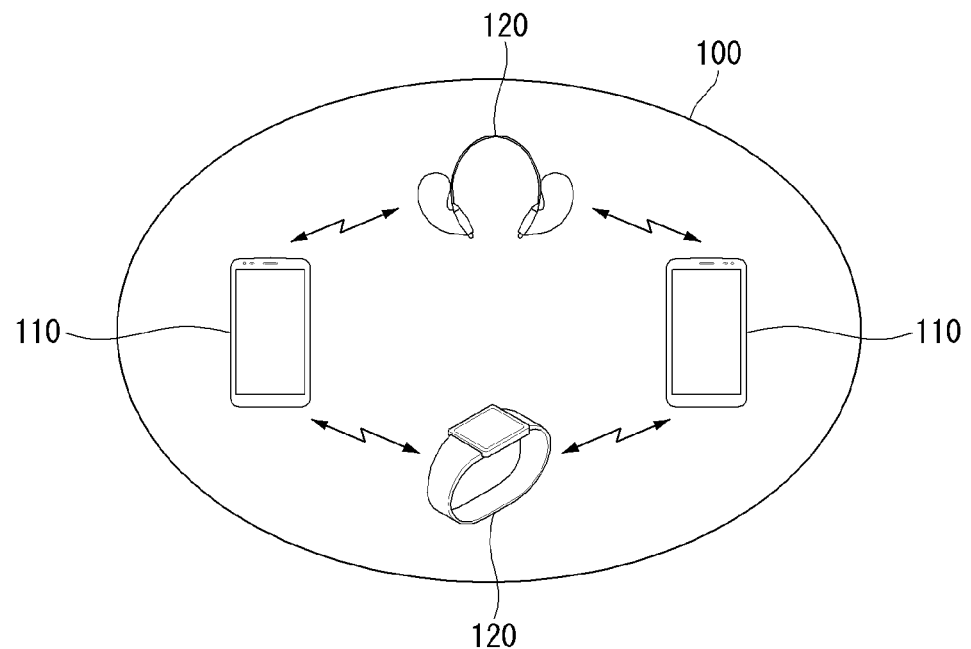

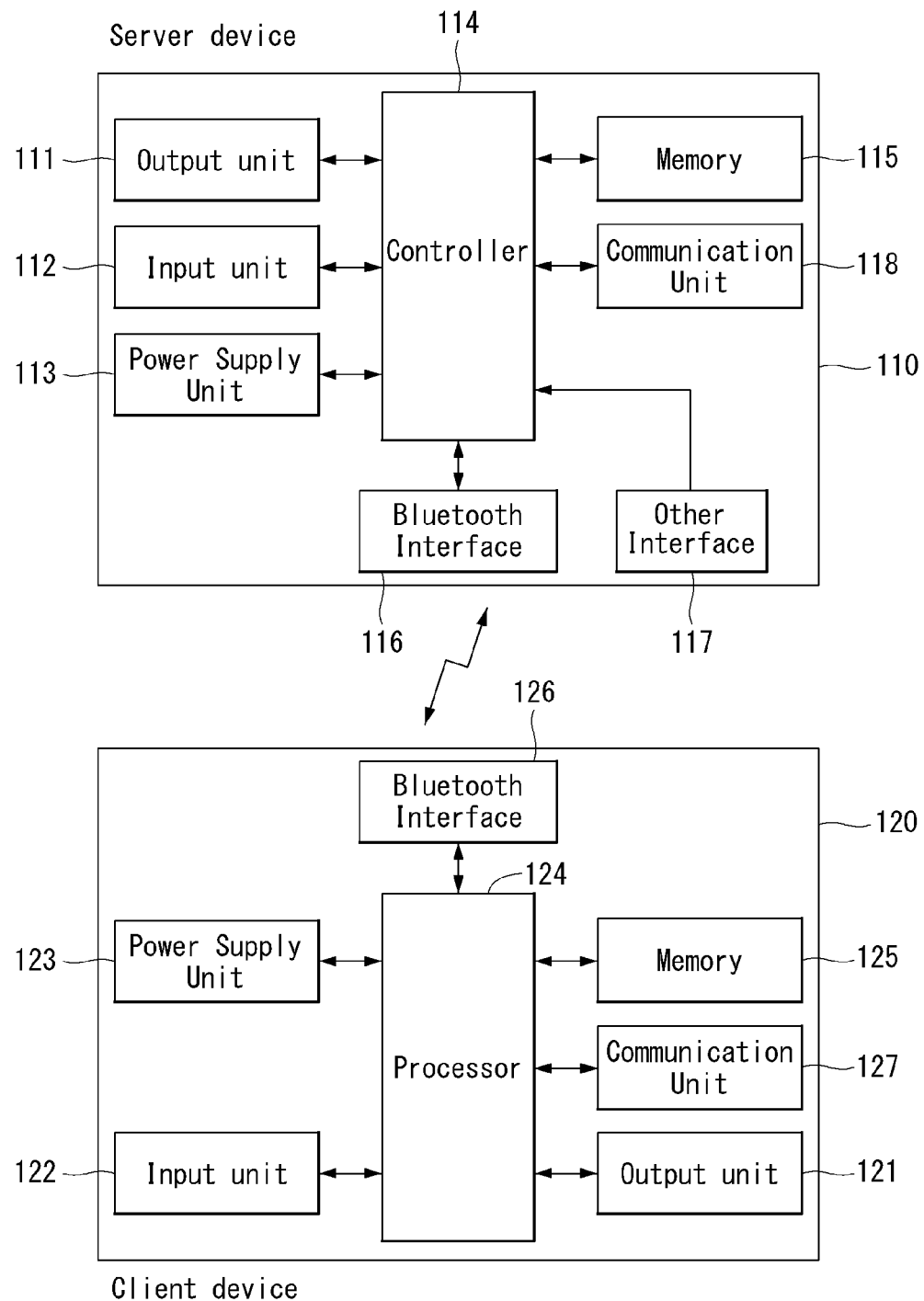
[FIG. 2]

[FIG. 3]
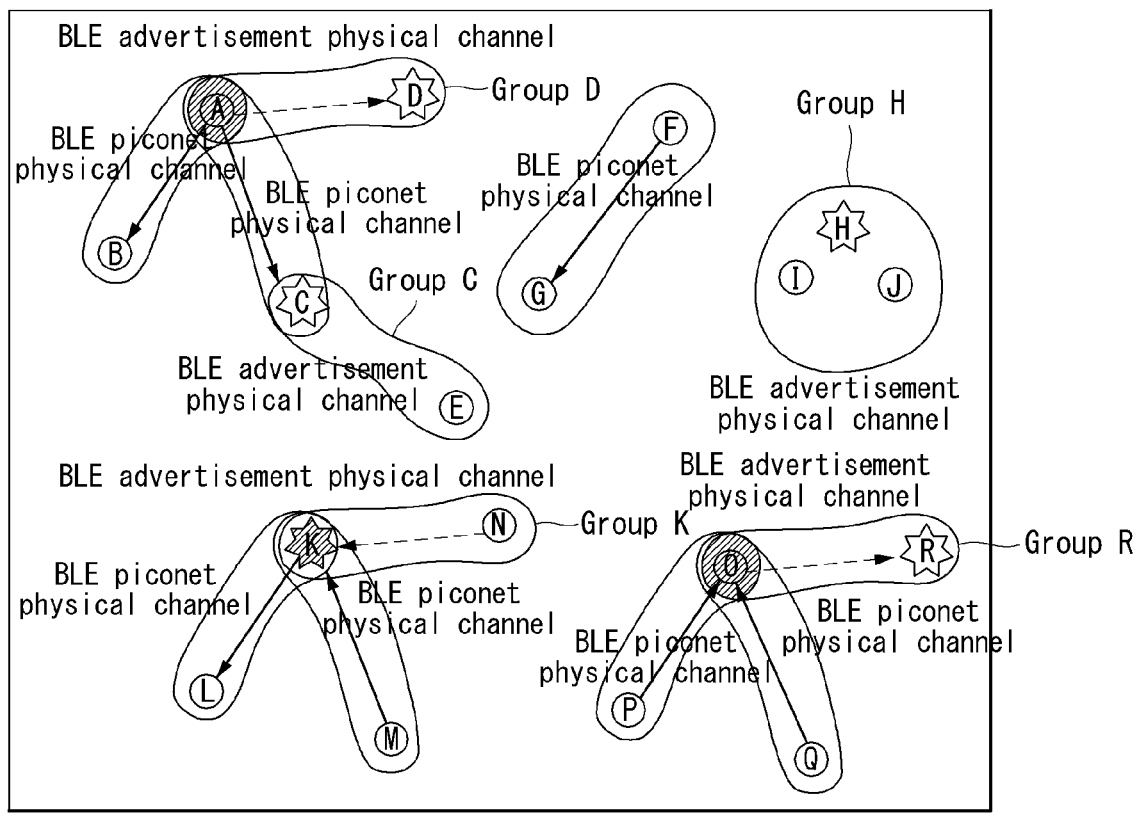

[FIG. 4]
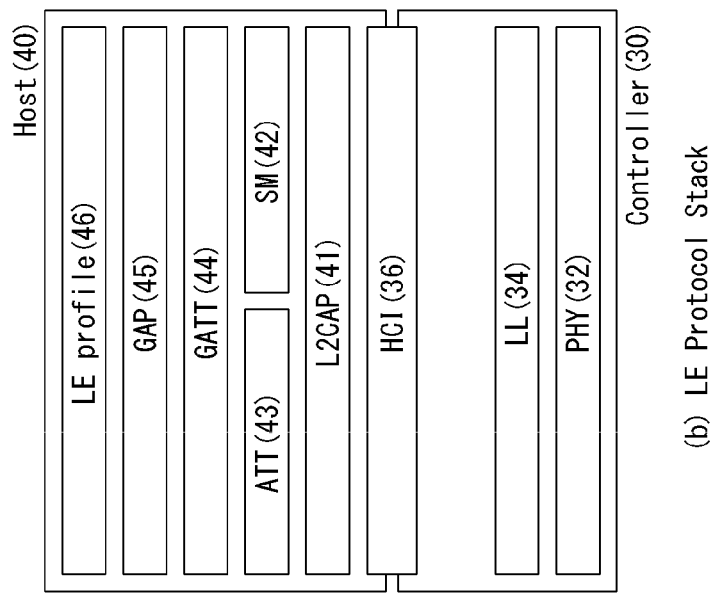
(b) LE Protocol Stack
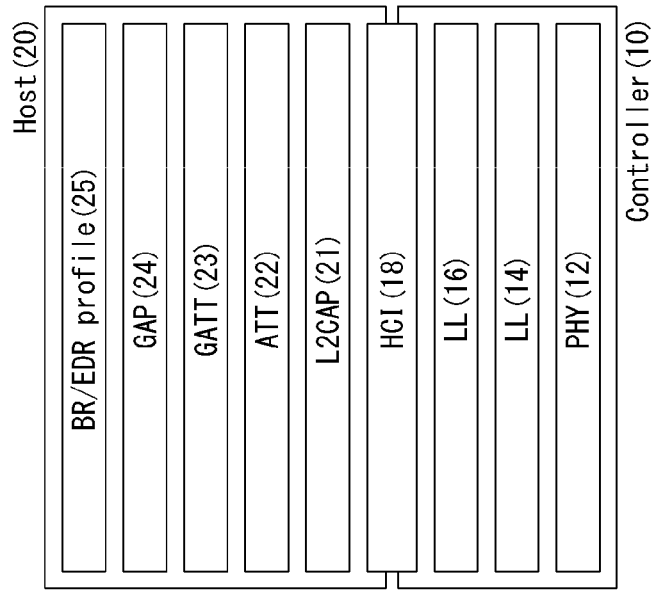
(a) BR/EDR Protocol Stack

[FIG. 5]
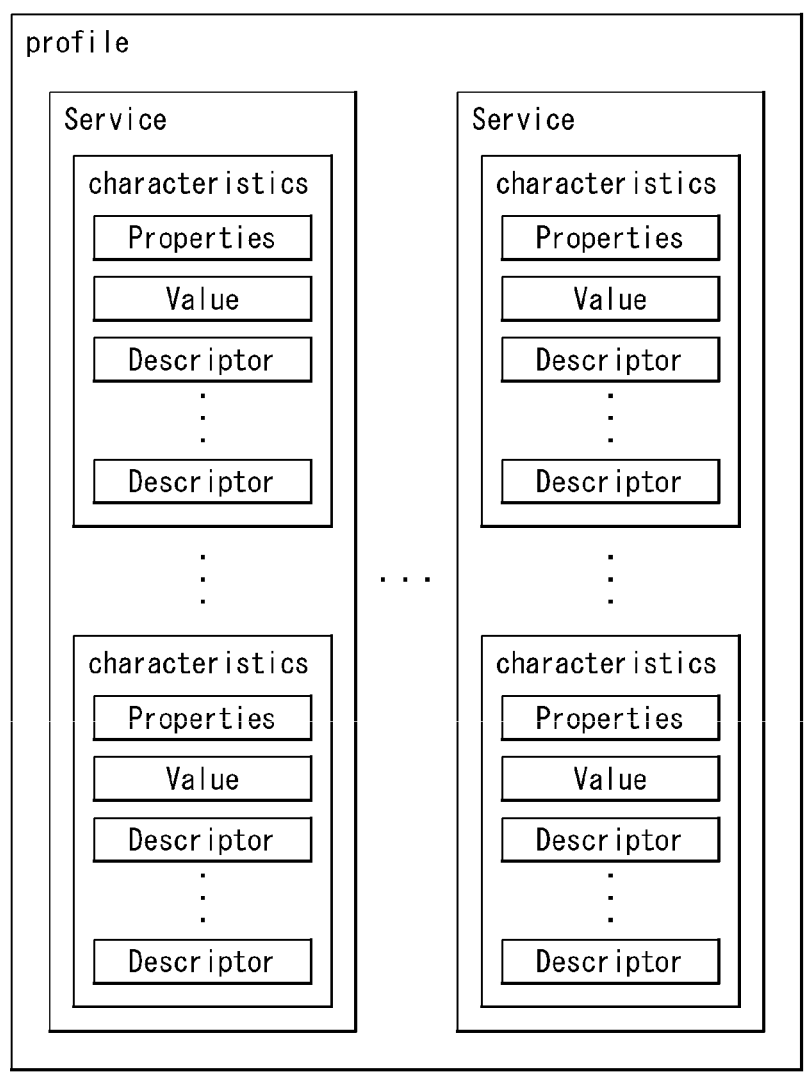

[FIG. 6]
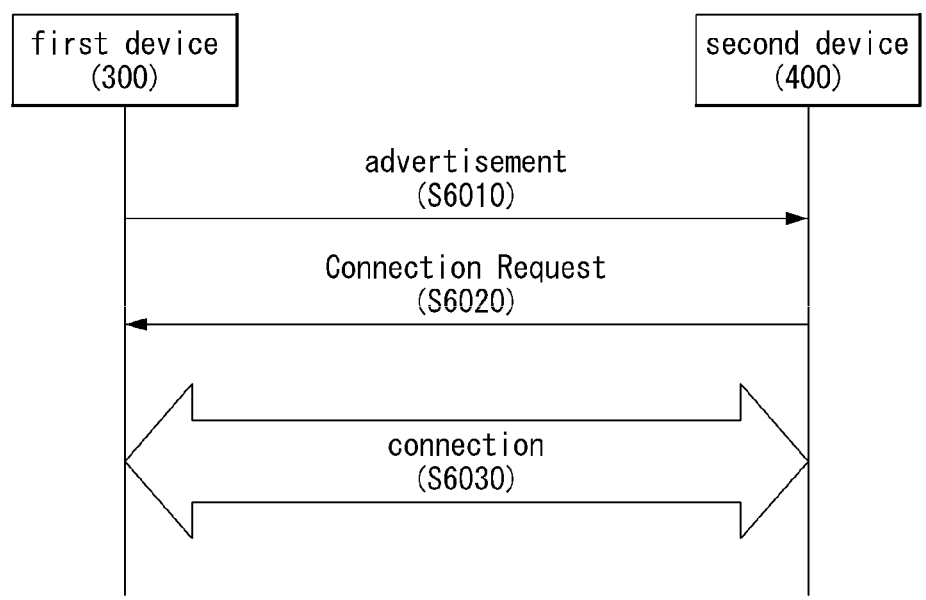

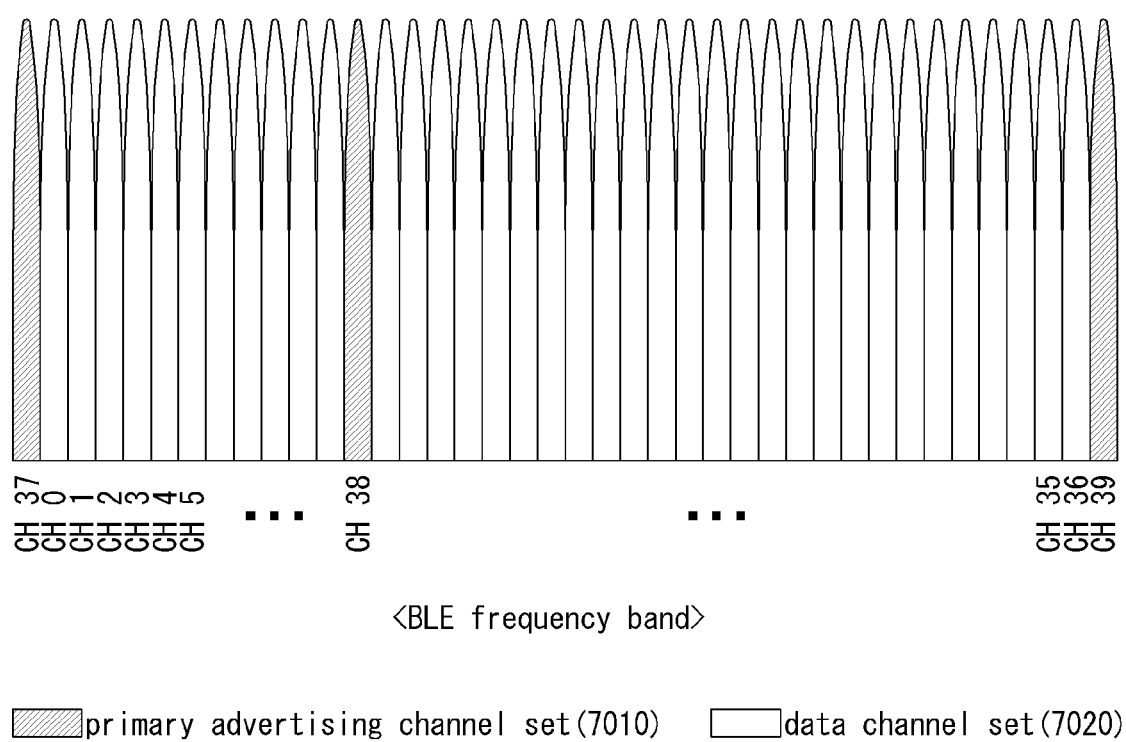
[FIG. 7]

[FIG. 8]
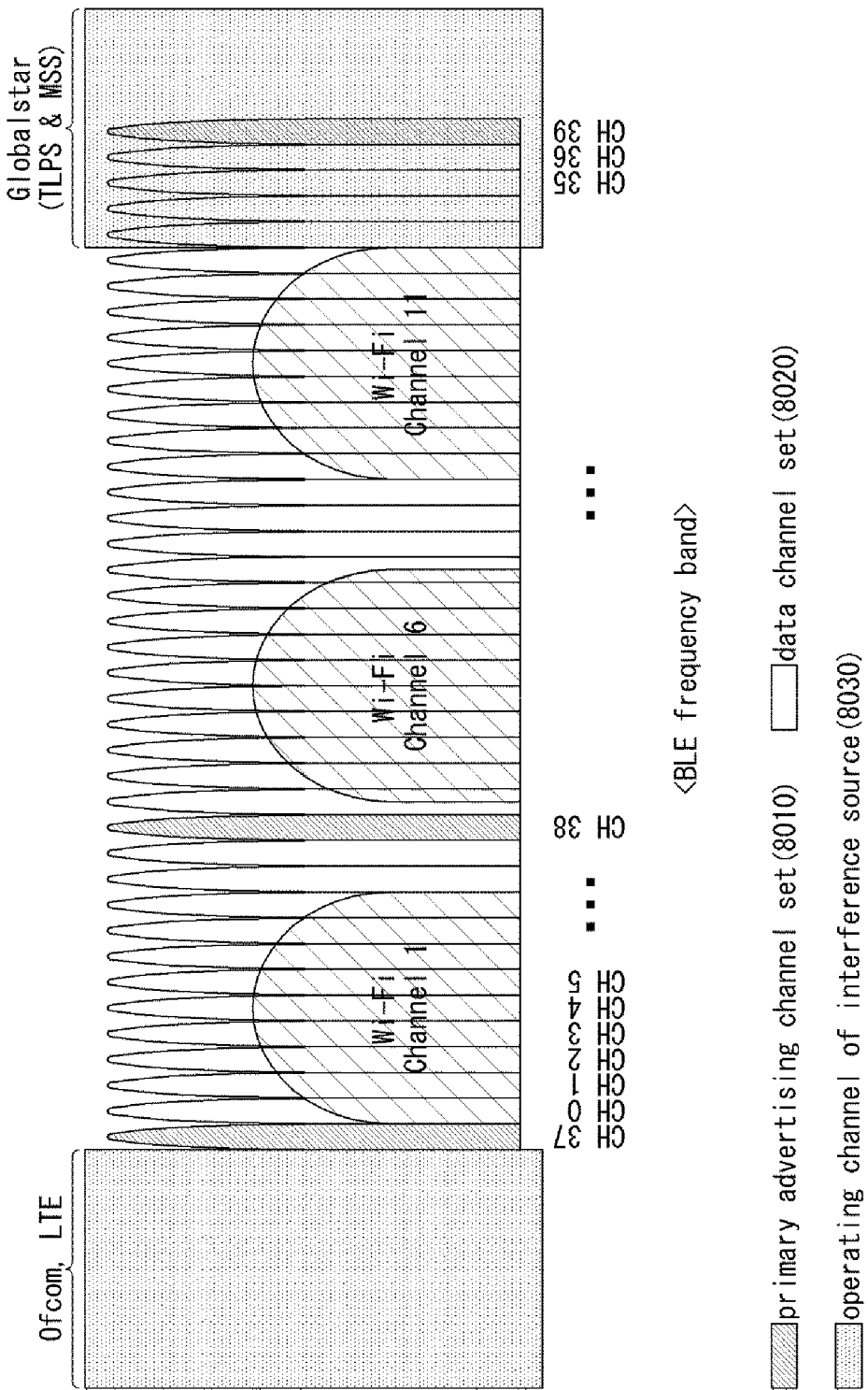

[FIG. 9]
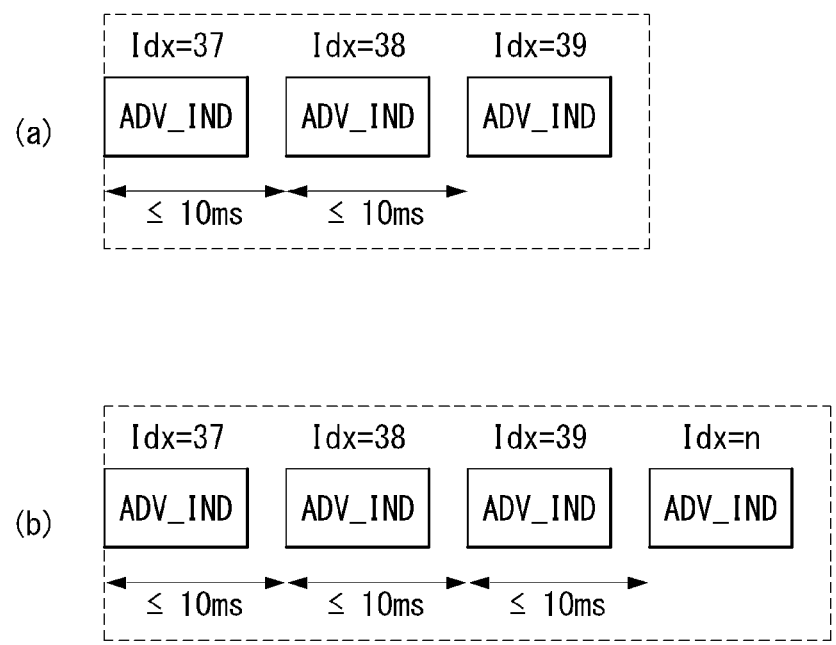

[FIG. 10]
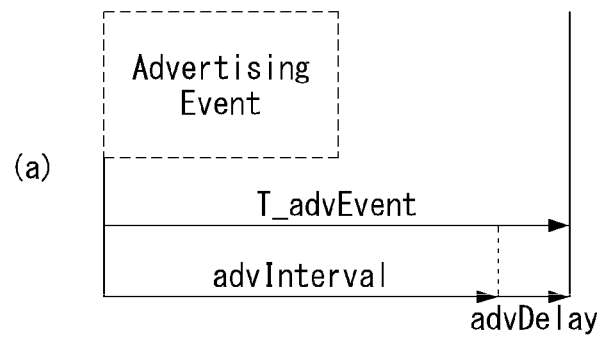
(a)
(b)
| Timer name | Value (Before Change) | Value (After Change) |
|---|---|---|
| $T_{GAP}$(adv_fast_interval1_coded) | 90ms to 180ms | 120ms to 180ms |
| $T_{GAP}$(adv_fast_interval1) | 30ms to 60ms | 40ms to 60ms |
| $T_{GAP}$(sacn_fast_interval) | 30ms to 60ms | 40ms to 80ms |
| $T_{GAP}$(scan_fast_window_coded) | 60ms | 80ms |
| $T_{GAP}$(scan_fast_window) | 30ms | 40ms |

[FIG. 11]
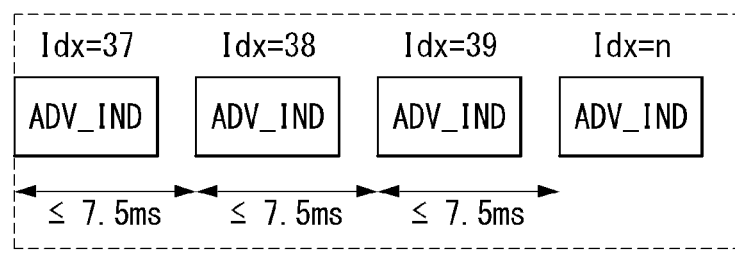

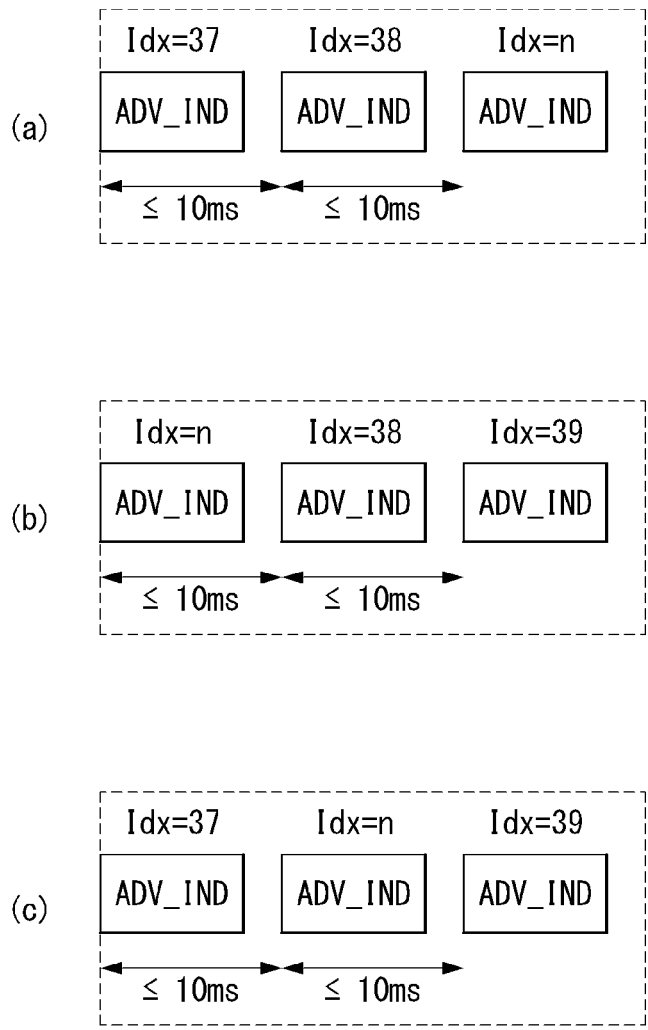
[FIG. 12]

| Value | Parameter Description |
|---|---|
| 00000000b | RFU |
| xxxxxxx1b | Channel 37 shall be used |
| xxxxxx1xb | Channel 38 shall be used |
| xxxxx1xxb | Channel 39 shall be used |
| 00000111b | Default(all channels enabled) |

(b)

| Value | Parameter Description |
|---|---|
| 00000000b | RFU |
| xxxxxxx1b | Channel 37 shall be used |
| xxxxxx1xb | Channel 38 shall be used |
| xxxxx1xxb | Channel 39 shall be used |
| xxxx1xxxb | Channel n shall be used |
| 00000111b | Default(all channels enabled) |

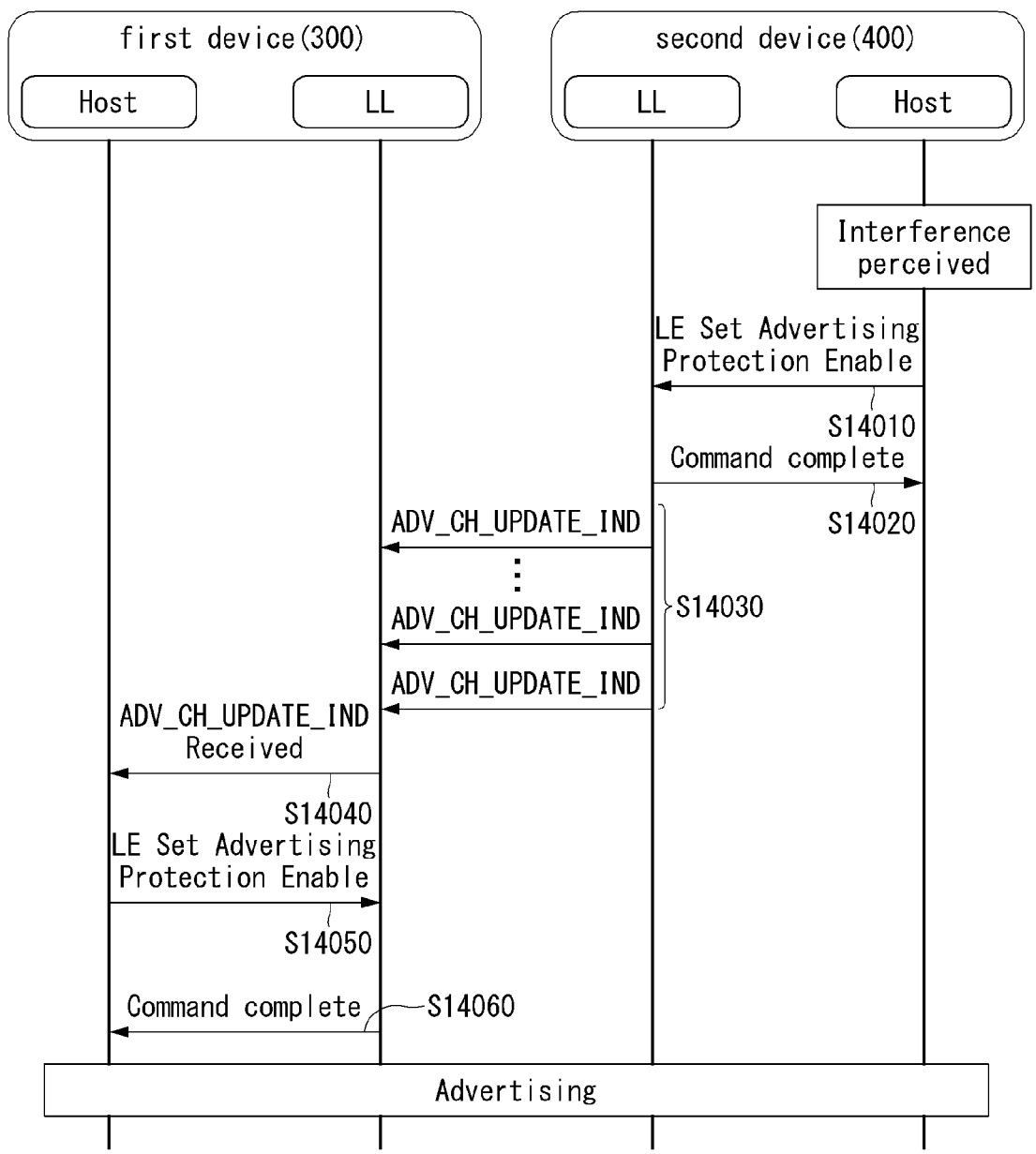
[FIG. 14]

| Payload ||
|---|---|
| AdvA (6 octet) | AdvChSet (1 octet) |

(b)

| Value | Description |
|---|---|
| 0x00 | Advertise over 3 channels (index=37, 38, 39) |
| 0x01 | Advertise over 4 channels (index=37, 38, 39, n) |
| 0x02-0xFF | RFU |

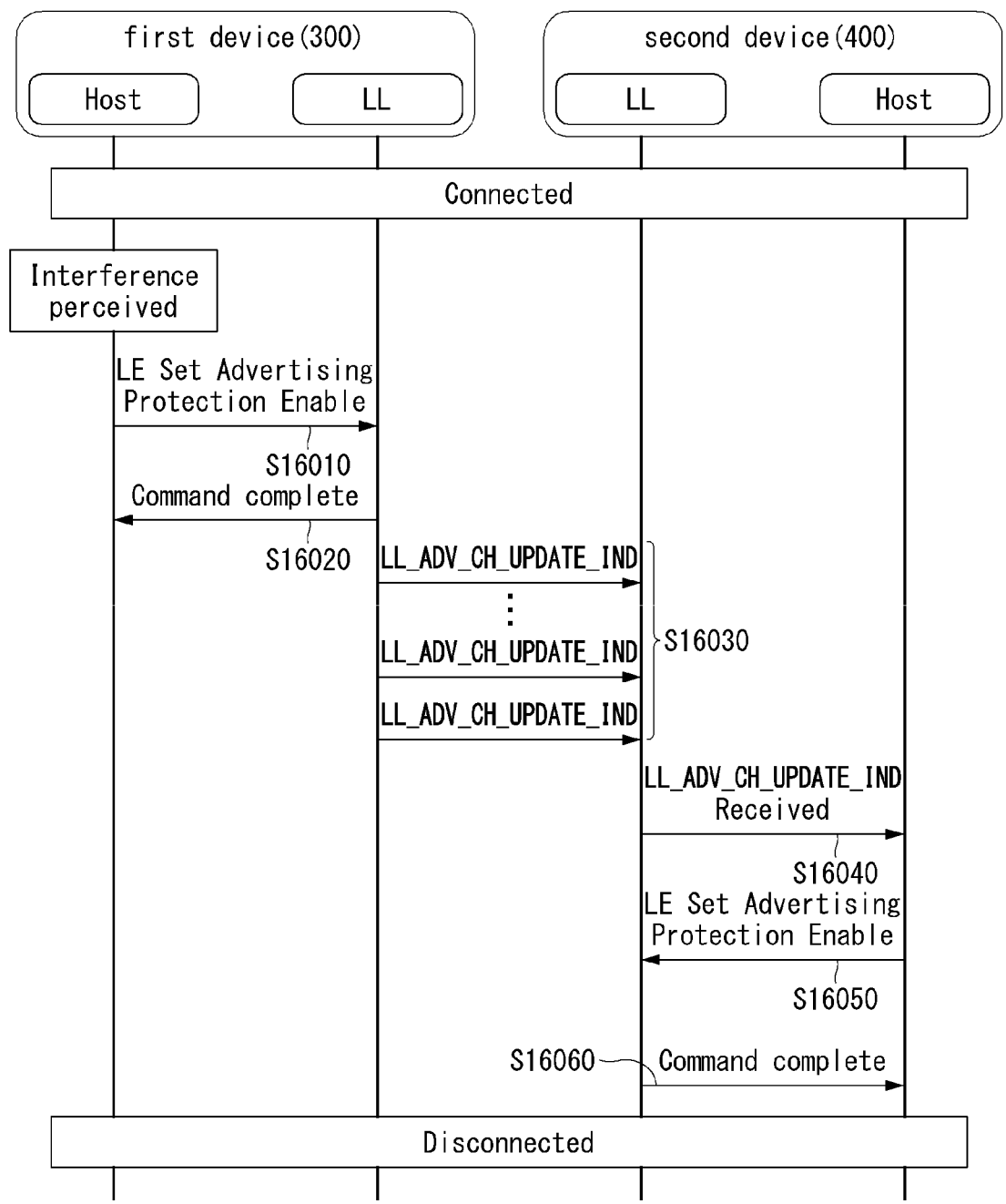

| Payload | |
|---|---|
| Opcode (1 octet) | CtrData (1 octet) |

(b)

| Value | Description |
|---|---|
| 0x00 | Advertise over 3 channels (index=37, 38, 39) |
| 0x01 | Advertise over 4 channels (index=37, 38, 39, n) |
| 0x02-0xFF | RFU |

[FIG. 18]
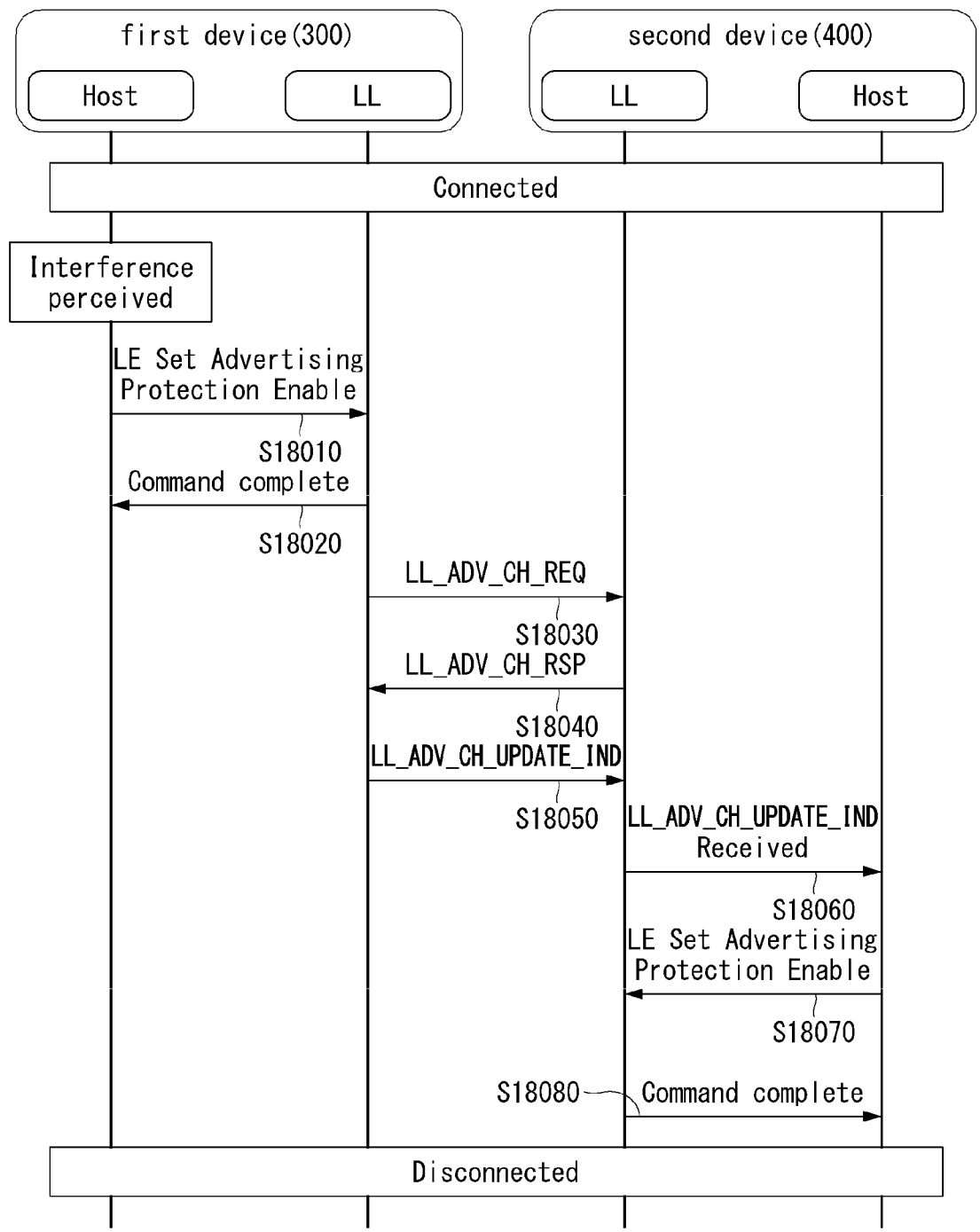

| Payload | |
|---|---|
| Opcode (1 octet) | CtrData (1 octet) |

(b)

| Bit number | Description |
|---|---|
| 0 | Set 0 available (index=37, 38, 39) |
| 1 | Set 1 available (index=37, 38, 39, n) |
| 2 | Set 2 available (index=37, 38, n) |
| ⋮ | ⋮ |

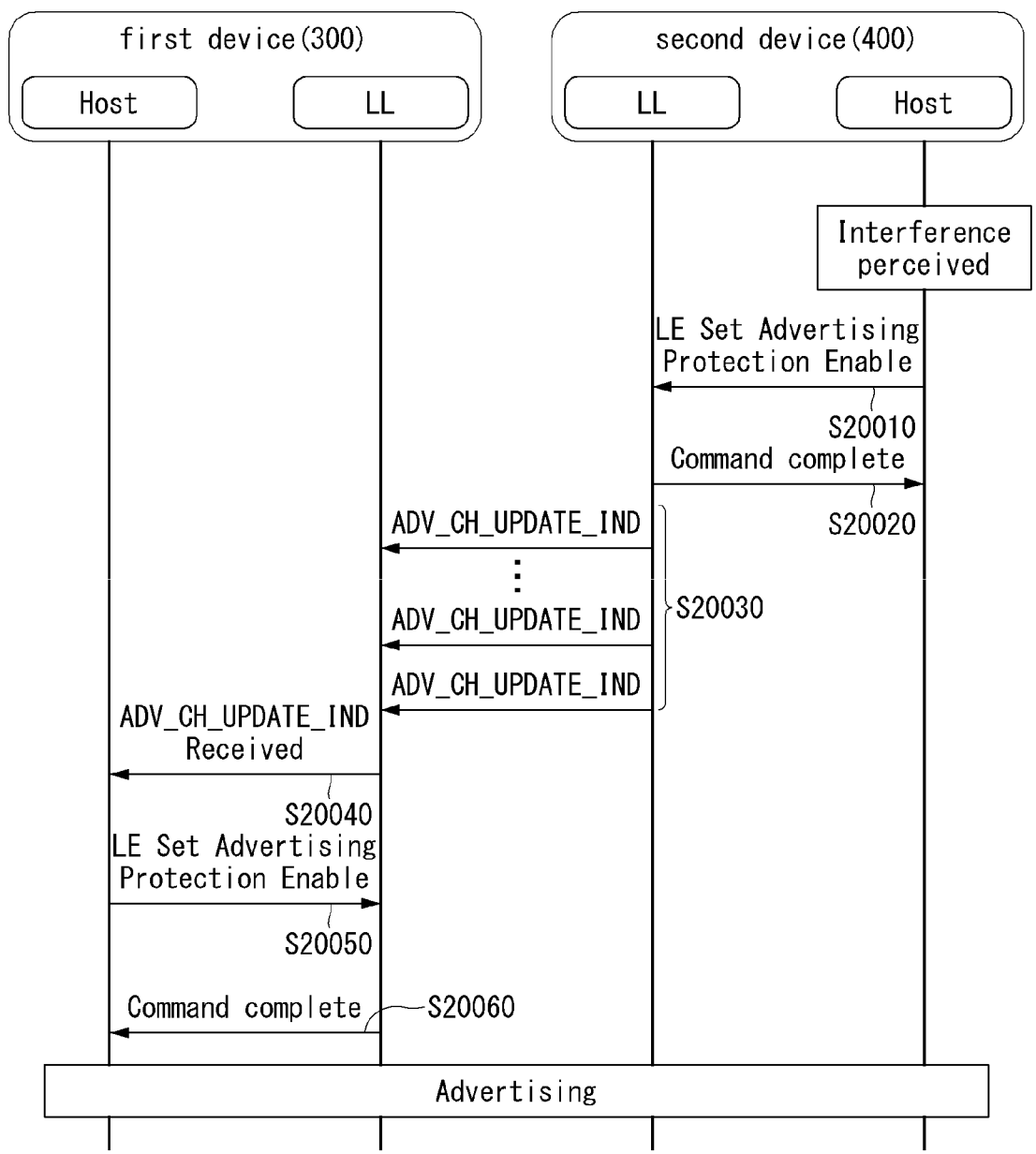
[FIG. 20]

| Payload | | |
|---|---|---|
| AdvA (6 octet) | DropAdvCh (1 octet) | AddAdvCh (1 octet) |

(b)

| Value | Description |
|---|---|
| 0x00 | Drop the 0th channel |
| ⋮ | ⋮ |
| 0x27 | Drop the 39th channel |
| 0x28-0xFF | RFU |

(c)

| Value | Description |
|---|---|
| 0x00 | Add the 0th channel |
| ⋮ | ⋮ |
| 0x27 | Add the 39th channel |
| 0x28-0xFF | RFU |

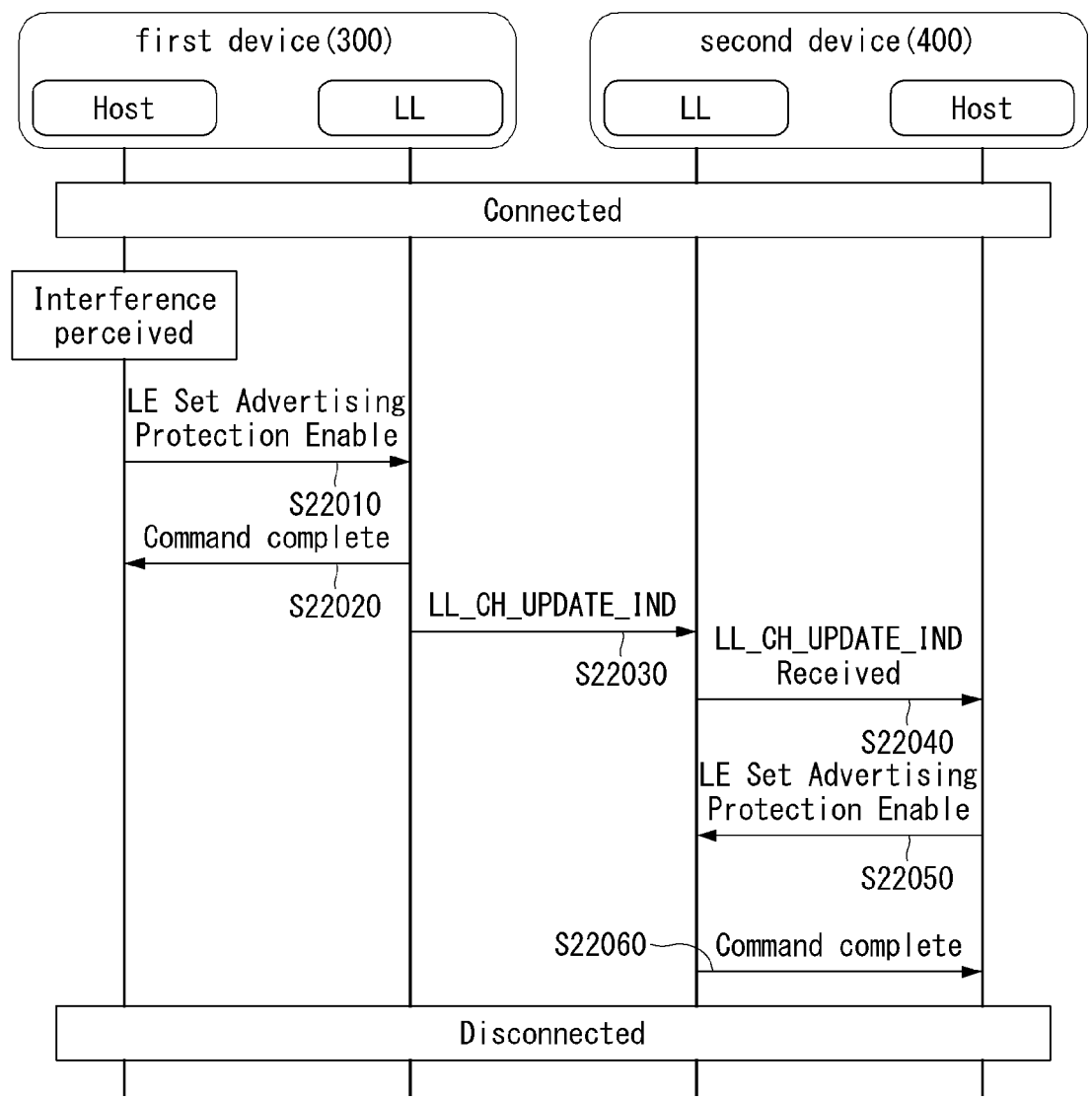
[FIG. 22]

[FIG. 23]

| Value | Description |
|---|---|
| 0x00 | Add/Drop the 0th channel |
| ⋮ | ⋮ |
| 0x27 | Add/Drop the 39th channel |
| 0x28-0xFF | RFU |

[FIG. 24]
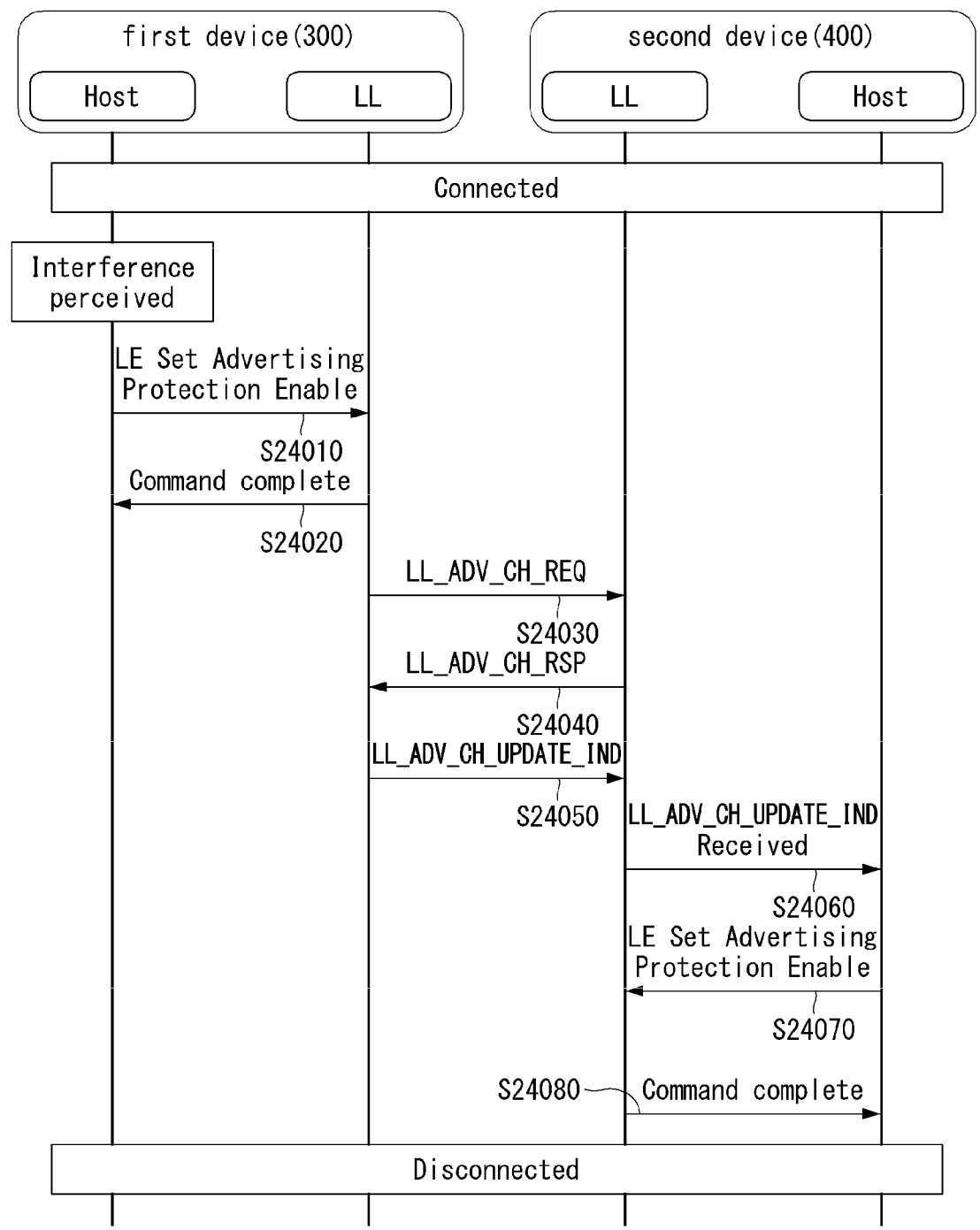

[FIG. 25]
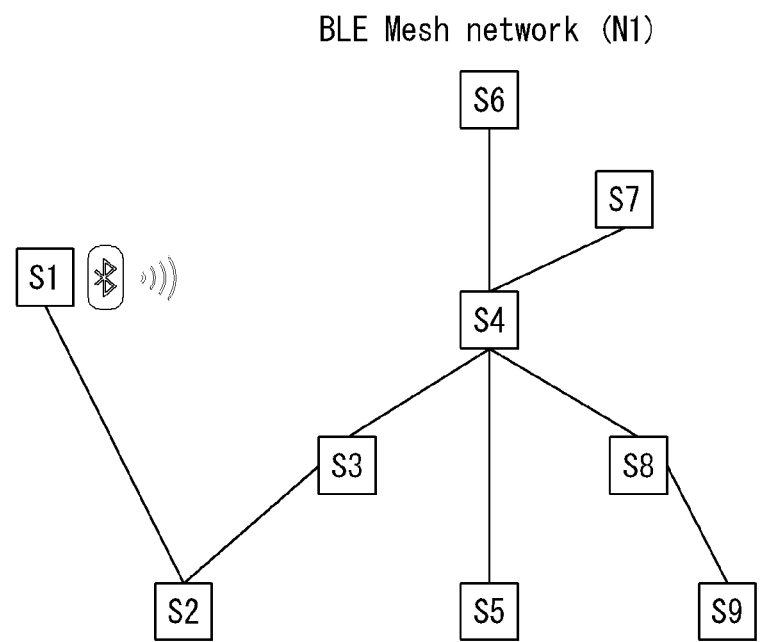

[FIG. 26]
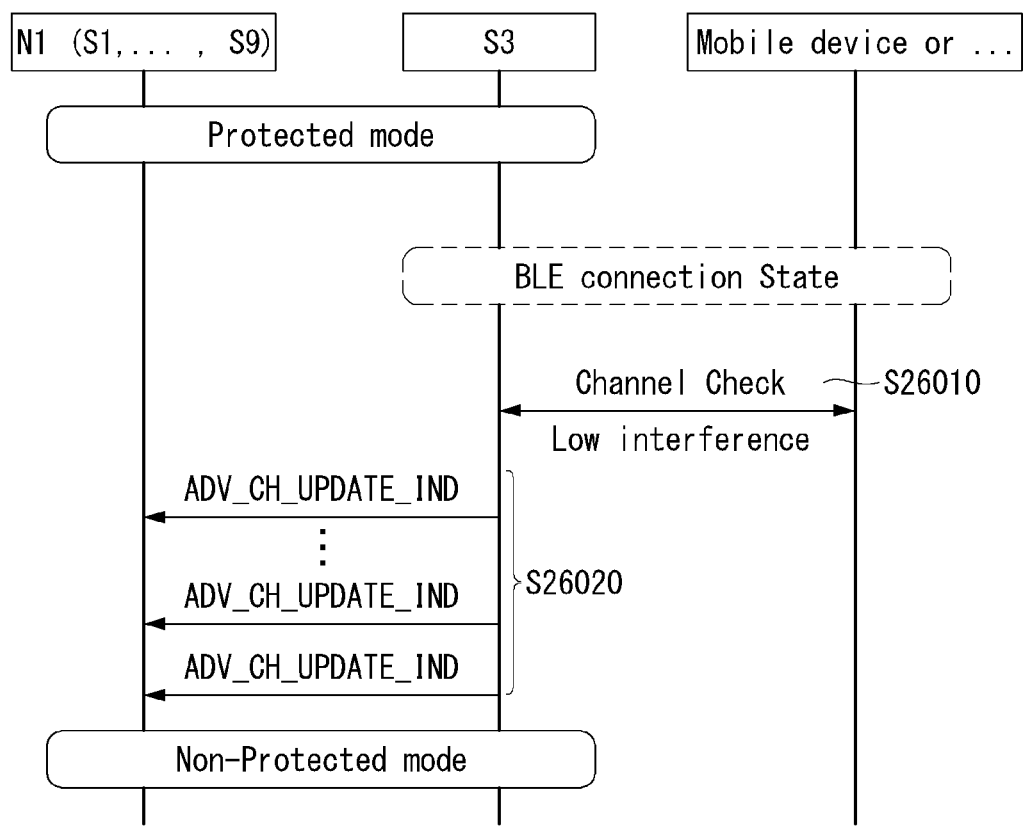

[FIG. 27]
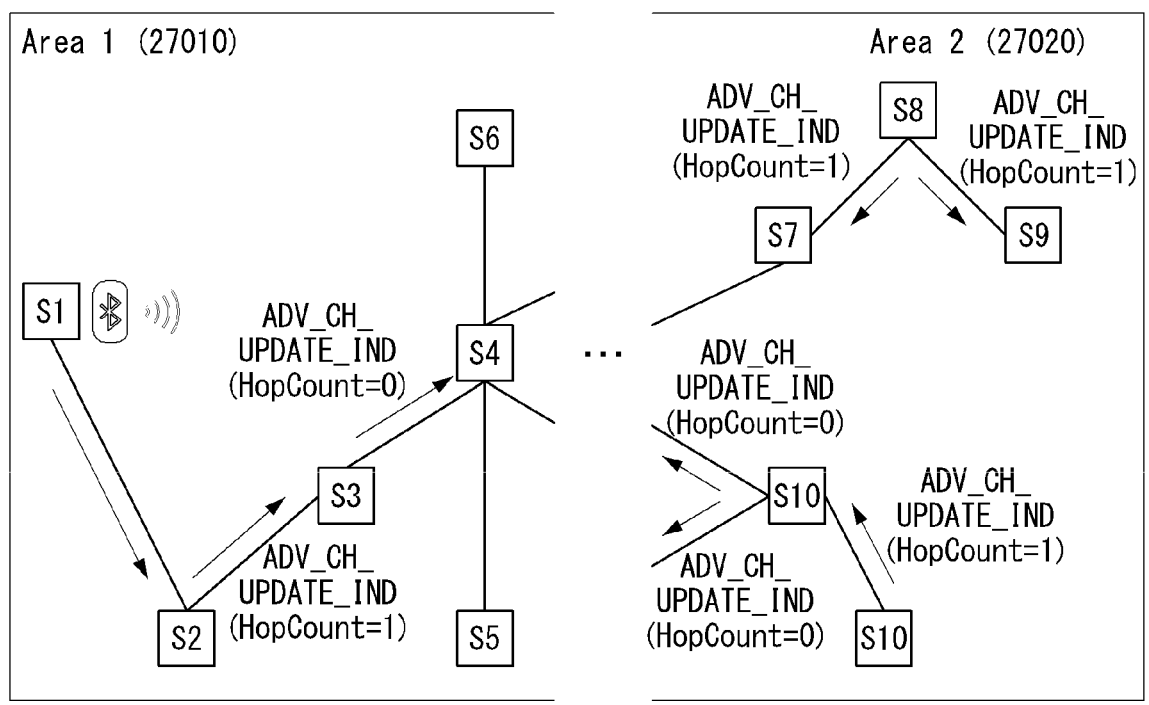

| Payload | | |
|---|---|---|
| AdvA (6 octet) | AdvChSet (6 bits) | HopCount (2 bits) |

(a)

| Payload | | | |
|---|---|---|---|
| AdvA (6 octet) | DropAdvCh (7 bits) | AddAdvCh (7 bits) | HopCount (2 bits) |

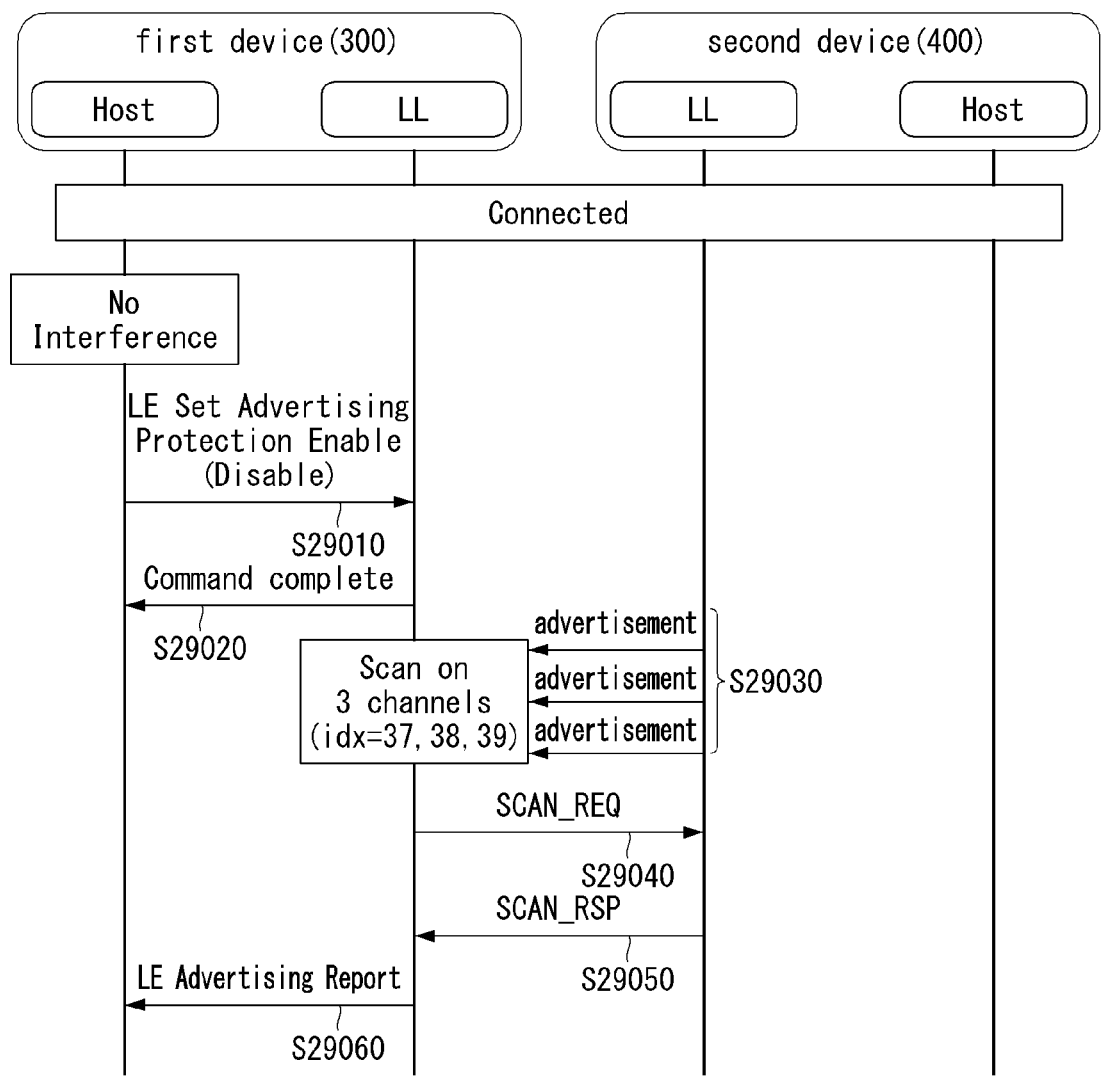
[FIG. 29]

[FIG. 30]

| Command | OCF | Command parameters | Return Paramters |
|---|---|---|---|
| HCI_LE_Set_Advertising_Protection_Enable | TBD | Advertising_Protection_Enable | Status |

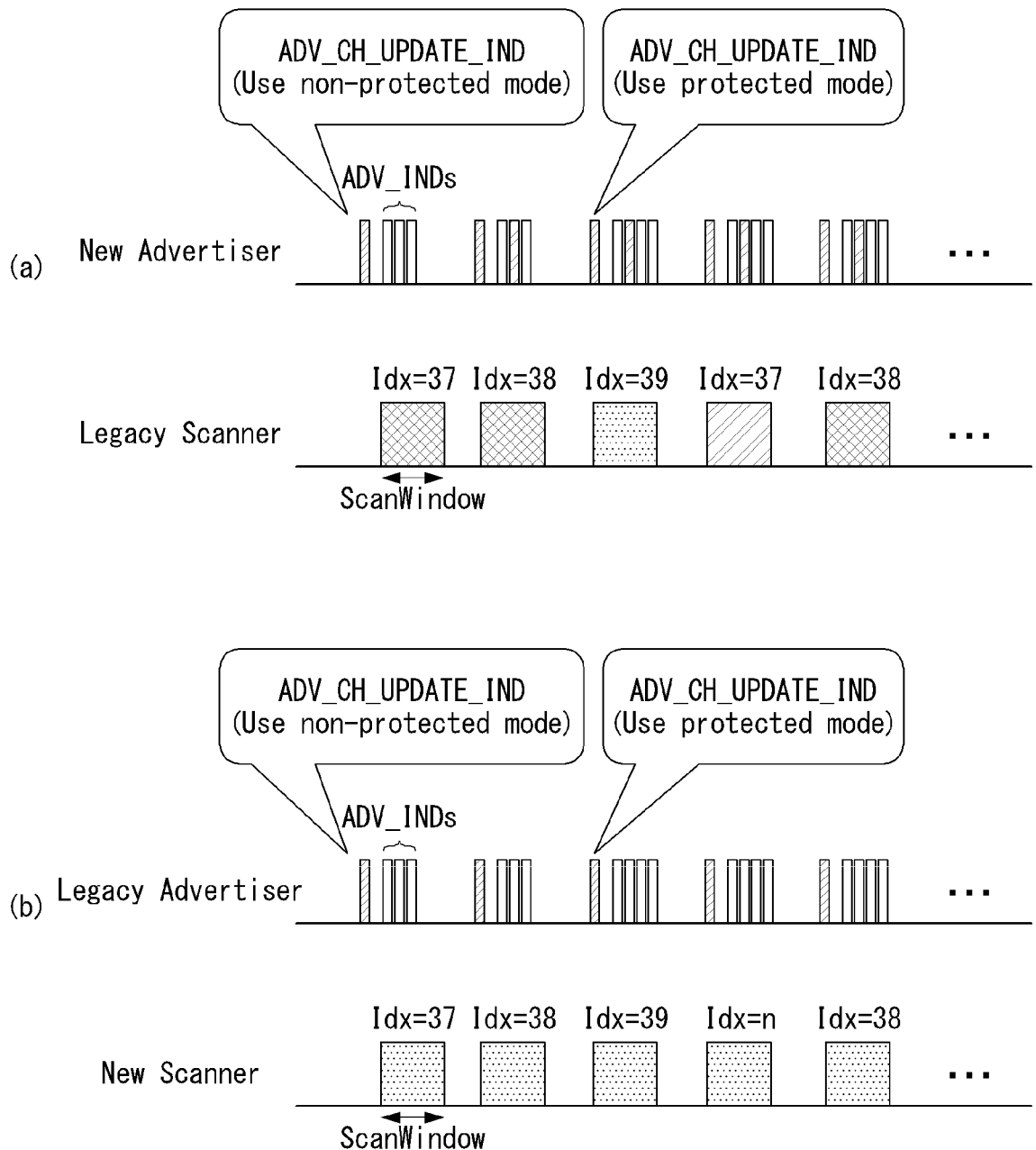
[FIG. 31]

[FIG. 32]
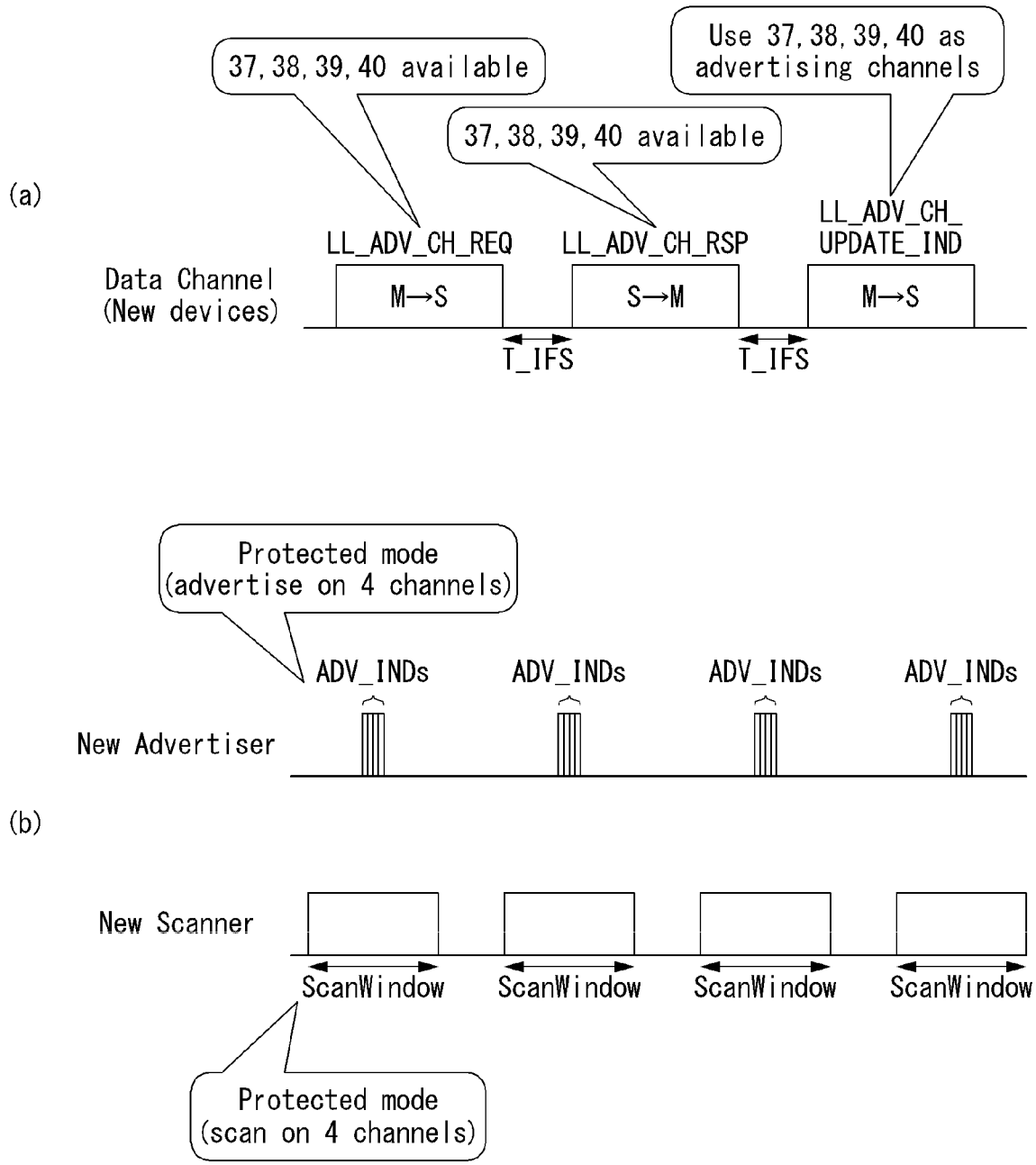

[FIG. 33]
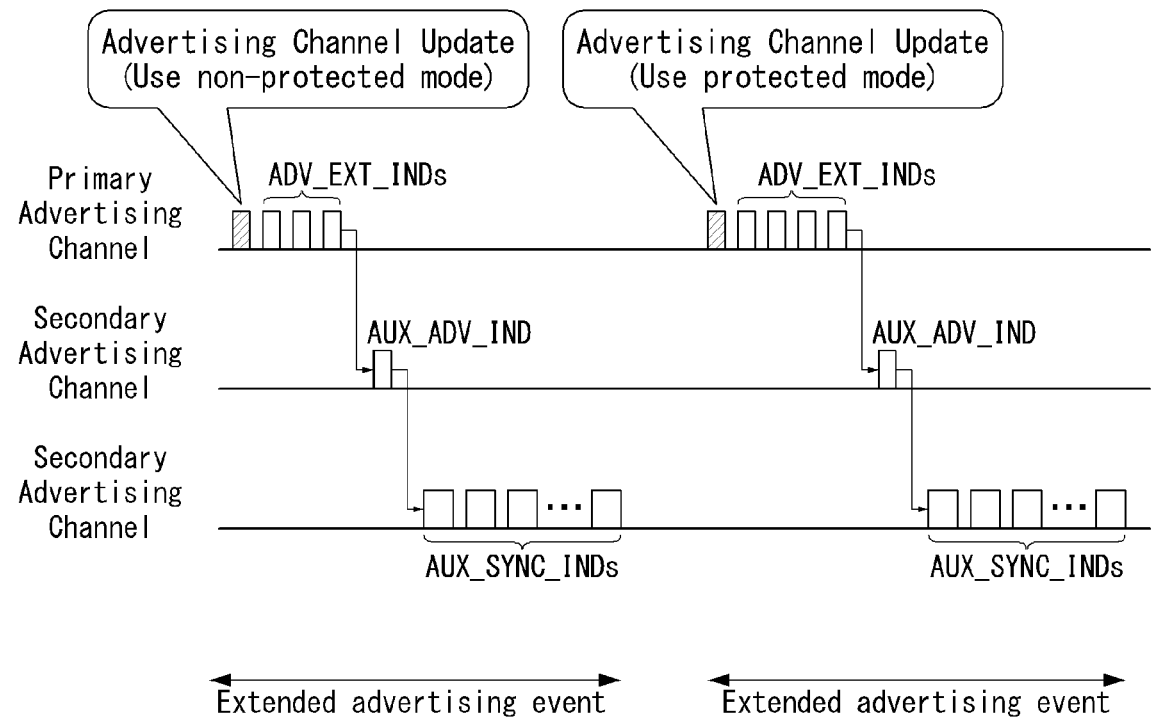

[FIG. 34]
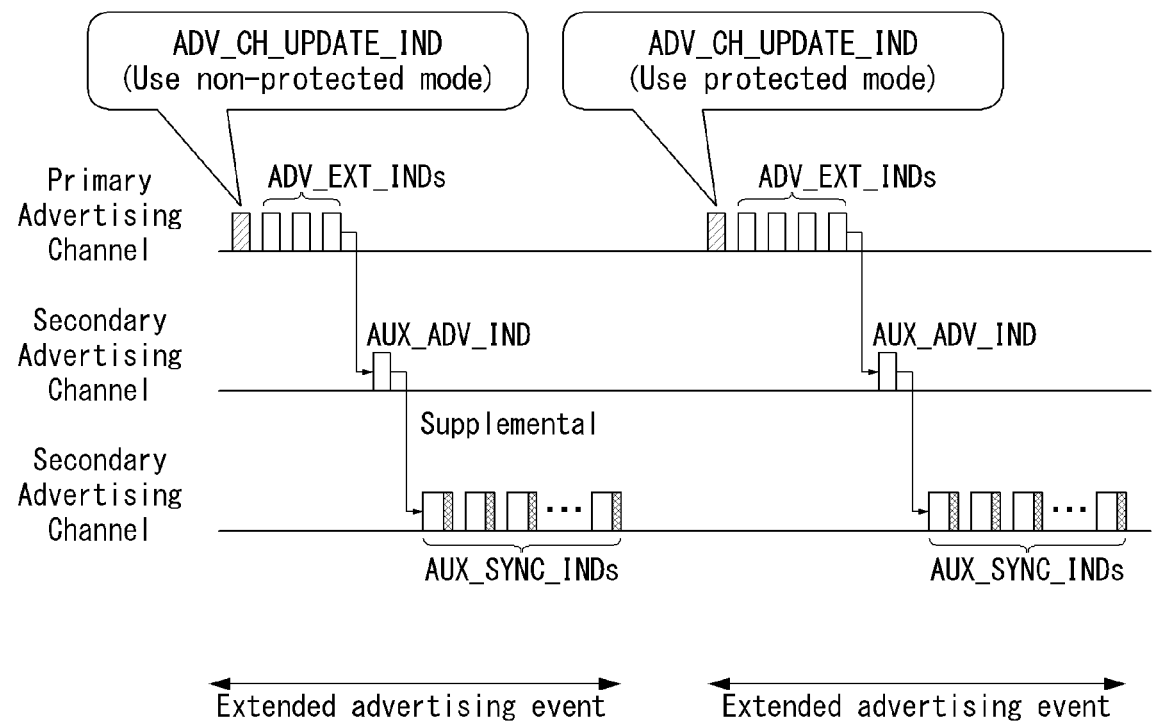

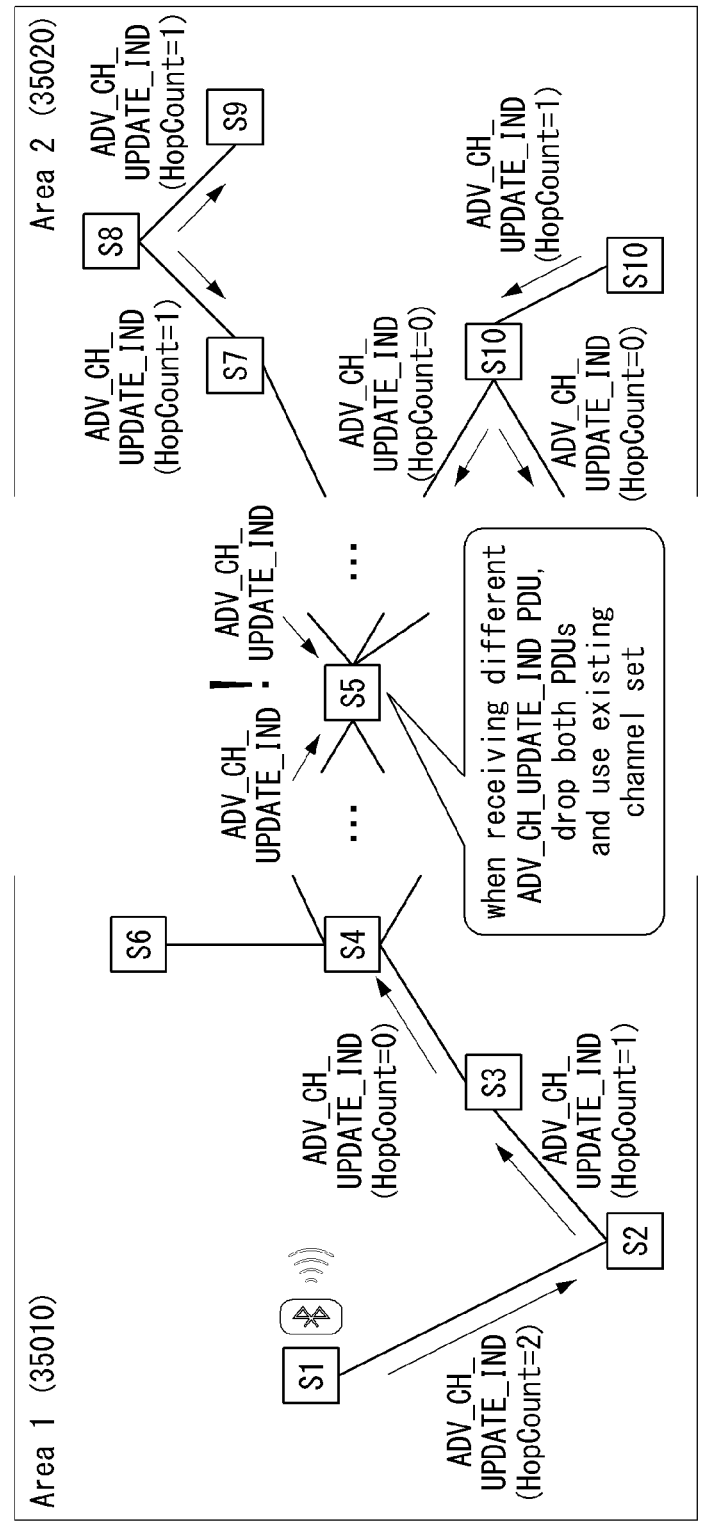
[FIG. 35]

[FIG. 36]
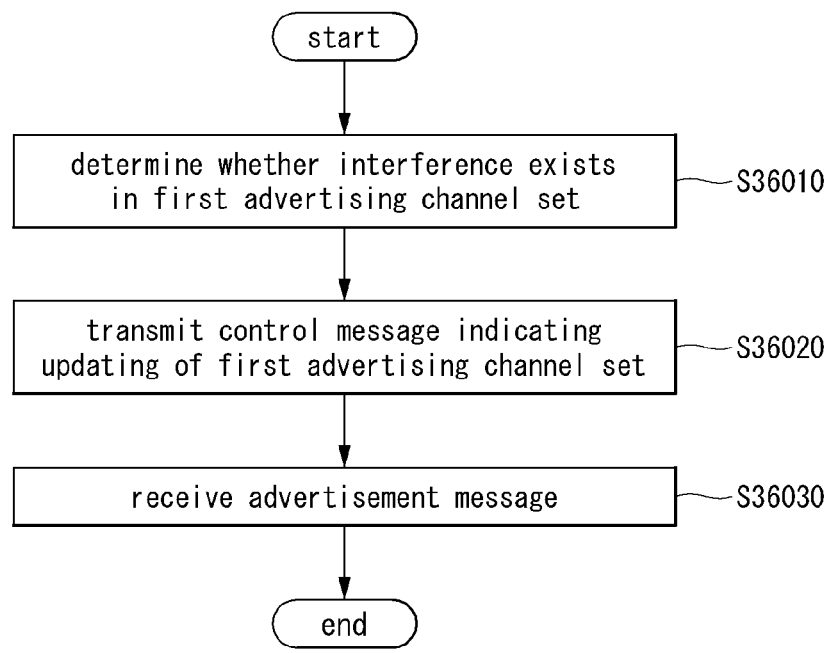

METHOD AND APPARATUS FOR SEARCHING FOR DEVICE BY USING BLUETOOTH LOW ENERGY (LE) TECHNOLOGY

CROSS REFERENCE TO RELATED APPLICATIONS

This application is the National Phase of PCT/KR2018/003186 filed on Mar. 19, 2018, which claims priority under 35 U.S.C. § 119(e) to U.S. Provisional Application Nos. 62/472,604 filed on Mar. 17, 2017; 62/488,068 filed on Apr. 21, 2017; and 62/507,743 filed on May 17, 2017, all of which are hereby expressly incorporated by reference into the present application.

TECHNICAL FIELD

The present disclosure relates to a method and apparatus for discovering a device using Bluetooth, a short-range technology, in a wireless communication system, and more particularly, a method and apparatus for protecting an advertising channel used for device discovery using Bluetooth low energy (BLE) technology.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

In the current BLE technology, advertisement using channels other than a primary advertising channel set is not possible. Therefore, in order to perform advertisement using four advertising channels, a new link layer protocol and a new host controller interface (HCI) are required.

In case where an advertising channel set is to be modified according to the presence of interference, it is necessary to share the corresponding information between an advertiser and a scanner, but the aforementioned technology cannot be implemented in the case of using an advertisement PDU defined in the existing BLE technology.

An embodiment of the present disclosure proposes a link layer protocol and an HCI to solve such a problem and to avoid interference occurring at a band boundary.

The technical problems to be achieved by the present disclosure are not limited to the above-mentioned technical problems and any other technical problems that are not mentioned may be clearly understood by those skilled in the art to which the present disclosure pertains from the following descriptions.

Technical Solution

In an aspect, a method for discovering an adjacent device in a wireless communication system using Bluetooth low energy (LE), which is performed by a first device, includes: recognizing an advertising channel in which interference exists among three advertising channels constituting a first advertising channel set; transmitting a control message instructing application of a protected mode to a second device, when the advertising channel in which interference exists is recognized, the protected mode indicating a mode for transmitting and receiving a message using a second advertising channel set updated from the first advertising channel set in a non-connection state; and receiving an advertisement message from the second device through the second advertising channel set.

Preferably, the second advertising channel set may be updated to additionally include at least one advertising channel in addition to the three advertising channels constituting the first advertising channel set.

Preferably, the control message may include at least one of operation code information instructing updating of the first advertising channel set, index information of the additionally included advertising channel, or number information of the advertising channels included in the second advertising channel set.

Preferably, the second advertising channel set may be updated to replace the advertising channel in which interference exists with a specific channel among data channels used for transmitting and receiving data.

Preferably, the control message may include at least one of operation code information instructing updating of the first advertising channel set, index information of the advertising channel in which interference exists, or index information of the replacing specific channel.

Preferably, the method may further include: transmitting a request message requesting information related to updating of the first advertising channel set to the second device; and receiving a response message including the information related to updating in response to the request message from the second device.

Preferably, the information related to updating may include information related to an auxiliary advertising channel available in the second device or information related to an advertising channel set available in the second device.

Preferably, the first device and the second device may form a mesh network.

Preferably, the control message may include at least one of operation code information indicating updating of the first advertising channel set, index information of the advertising channel in which interference exists, an index information of an advertising channel added to the first advertising channel set, number information of the advertising channels included in the second advertising channel set, or hop count information for limiting a maximum hop number.

Preferably, the control message may be dropped or transmitted to one or more adjacent devices by the second device according to the hop count value.

In another aspect, a first device for discovering an adjacent device in a wireless communication system using Bluetooth low energy (LE) includes: a communication unit communicating with an external device wirelessly or wiredly; and a processor functionally connected to the communication unit, wherein the processor recognizes an advertising channel in which interference exists among three advertising channels constituting a first advertising channel set, transmits a control message instructing application of a protected mode to a second device, when the advertising channel in which interference exists is recognized, the protected mode indicating a mode for transmitting and receiving a message using a second advertising channel set updated from the first advertising channel set in a non-connection state, and receives an advertisement message from the second device through the second advertising channel set.

Preferably, the second advertising channel set may be updated to additionally include at least one advertising channel in addition to the three advertising channels constituting the first advertising channel set.

Preferably, the control message may include at least one of operation code information instructing updating of the first advertising channel set, index information of the additionally included advertising channel, or number information of the advertising channels included in the second advertising channel set.

Preferably, the second advertising channel set may be updated to replace the advertising channel in which interference exists with a specific channel among data channels used for transmitting and receiving data.

Preferably, the control message may include at least one of operation code information instructing updating of the first advertising channel set, index information of the advertising channel in which interference exists, or index information of the replacing specific channel.

Advantageous Effects

According to an embodiment of the present disclosure, by additionally including another advertising channel to a primary advertising channel set used in the existing BLE technology, a degradation of advertisement/scanning efficiency may be prevented despite the presence of interference occurring at the edge of a BLE frequency band and reliability of discovery of a BLE device may be increased.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

FIG. 1 is a schematic view illustrating an example of a wireless communication system using the Bluetooth low energy (BLE) technology proposed in the present disclosure.

FIG. 2 shows an example of an internal block diagram of a device that may implement the methods proposed in the present disclosure.

FIG. 3 shows an example of a BLE topology.

FIG. 4 is a diagram illustrating an example of a Bluetooth communication architecture to which the methods proposed in the present disclosure may be applied.

FIG. 5 is a diagram illustrating an example of a structure of a generic attribute profile) of BLE.

FIG. 6 is a flowchart illustrating a method of forming a connection using BLE between devices.

FIG. 7 is a diagram illustrating a frequency band of a BLE advertising channel, as an embodiment to which the present disclosure may be applied.

FIG. 8 is a diagram illustrating a frequency band of an advertising channel, as an embodiment to which the present disclosure may be applied.

FIG. 9 is a diagram illustrating an advertising channel set which additionally uses an advertising channel, as an embodiment to which the present disclosure is applied.

FIG. 10 is a diagram illustrating a generic access profile (GAP) timer according to the use of an additional advertising channel, as an embodiment to which the present disclosure is applied.

FIG. 11 is a diagram illustrating an advertising channel set additionally using an advertising channel, as an embodiment to which the present disclosure is applied.

FIG. 12 shows an example of an advertising event according to a modified advertising channel set, as an embodiment to which the present disclosure is applied.

FIG. 13 shows an example of a method of performing an advertisement using four fixed channels, as an embodiment to which the present disclosure is applied.

FIG. 14 is a flowchart illustrating a method of modifying an advertising channel set according to whether interference exists in an advertising channel, as an embodiment to which the present disclosure is applied.

FIG. 15 is a diagram illustrating a format of an advertising packet indicating whether to apply a protected mode of an advertising channel, as an embodiment to which the present disclosure is applied.

FIG. 16 is a flowchart illustrating a method of modifying an advertising channel set according to whether interference exists in an advertising channel, as an embodiment to which the present disclosure is applied.

FIG. 17 is a diagram illustrating an example of a format of a control message indicating whether to apply a protected mode of an advertising channel, as an embodiment to which the present disclosure is applied.

FIG. 18 is a flowchart illustrating a method of modifying an advertising channel set through a negotiation procedure according to whether interference exists in an advertising channel, as an embodiment to which the present disclosure is applied.

FIG. 19 is a diagram illustrating a format of a control message indicating whether to apply a protected mode of an advertising channel, as an embodiment to which the present disclosure is applied.

FIG. 20 is a flowchart illustrating a method of modifying an advertising channel set according to whether interference exists in an advertising channel, as an embodiment to which the present disclosure is applied.

FIG. 21 is a diagram illustrating an example of a format of an advertising packet indicating whether to apply a protected mode of an advertising channel, as an embodiment to which the present disclosure is applied.

FIG. 22 is a flowchart illustrating a method of modifying an advertising channel set according to whether an interference exists in an advertising channel, as an embodiment to which the present disclosure is applied.

FIG. 23 is a diagram illustrating an example of a format of control information including advertising channel information related to application of a protected mode of an advertising channel, as an embodiment to which the present disclosure is applied.

FIG. 24 is a flowchart illustrating a method of modifying an advertising channel set through a negotiation procedure according to whether interference exists in an advertising channel, as an embodiment to which the present disclosure is applied.

FIG. 25 is a diagram illustrating a method of protecting an advertising channel in a mesh network, as an embodiment to which the present disclosure is applied.

FIG. 26 is a diagram illustrating an example of a method of releasing protection of an advertising channel in a mesh network, as an embodiment to which the present disclosure is applied.

FIGS. 27 and 28 illustrate a method of applying a protected mode of an advertising channel according to an interference environment for each region in the case of establishing a wide area mesh network, as an embodiment to which the present disclosure is applied.

FIGS. 29 and 30 are flowcharts illustrating a method of modifying a scanning mode according to the presence or absence of interference, as an embodiment to which the present disclosure may be applied.

FIG. 31 is a diagram illustrating an operation between a new device and a legacy device when a protected mode of an advertising channel is applied, as an embodiment to which the present disclosure may be applied.

FIG. 32 is a diagram illustrating a method of applying a protected mode of an advertising channel, as an embodiment to which the present disclosure may be applied.

FIG. 33 is a diagram illustrating a method of periodically indicating whether a protected mode of an advertising channel is applied, as an embodiment to which the present disclosure may be applied.

FIG. 34 is a diagram illustrating a method for periodically indicating whether to apply a protected mode of an advertising channel, as an embodiment to which the present disclosure may be applied.

FIG. 35 is a diagram illustrating a method of applying a protected mode of an advertising channel according to an interference environment for each region in the case of establishing a wide area mesh network, as an embodiment to which the present disclosure may be applied.

FIG. 36 illustrates an example of a method for protecting an advertising channel, as an embodiment to which the present disclosure is applied.

MODE FOR INVENTION

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present disclosure will be described in detail with reference to the accompanying drawings. In the following description, usage of suffixes such as 'module', 'part' or 'unit' used for referring to elements is given merely to facilitate explanation of the present disclosure, without having any significant meaning by itself.

FIG. 1 is a schematic view illustrating an example of a wireless communication system using a Bluetooth low energy technology to which the present disclosure is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

In addition, there are a number of devices that measure physical activities of human beings using a specific device, but there is no device that transmits measured data via Bluetooth to show a specific data value to a user.

Therefore, in order to solve this problem, the present disclosure proposes a method of measuring a physical activity of a human being, transmitting and processing the measured data through Bluetooth LE, and providing the same to a user.

FIG. 2 shows an example of an internal block diagram of a device that may implement the methods proposed in the present disclosure.

As shown in FIG. 2, a server device includes an output unit (display unit) 111, an input unit (user input interface) 112, a power supply unit 113, a processor, a memory 115, a Bluetooth interface 116, another communication interface 117, and a communication unit (or a transceiver unit 118).

The output unit 111, the input unit 112, the power supply unit 113, the processor 114, the memory 115, the Bluetooth interface 116, the other communication interface 117, and the communication unit 118 are functionally connected to each other to carry out the method proposed in the present disclosure.

In addition, a client device includes an output unit (display unit) 121, an input unit (user Input Interface) 122, a power supply unit 123, a processor 124, a memory 125, a Bluetooth interface 126, and a communication unit (or a transceiver unit 127).

The output unit 121, the input unit 122, the power supply unit 123, the processor 124, the memory 125, the Bluetooth interface 126, and the communication unit 127 are functionally connected to each other to perform the methods proposed in the present disclosure.

The Bluetooth interface 116 or 126 refers to units (or modules) capable of transmitting requests/responses, commands, notifications, instructions/confirmation messages, or the like between devices using Bluetooth technology.

The memory 115 or 125, as a unit implemented in various types of devices, refer to units in which various types of data are stored.

The processor 114 or 124 refer to a module that controls an overall operation of the server device or the client device, and control to request transmission of a message and process a received message through a Bluetooth interface and another communication interface.

The processor 114 or 124 may be represented by a controller, a control unit, or the like.

The processor 114 or 124 may include an application-specific integrated circuit (ASIC), another chipset, a logic circuit, and/or a data processing device.

The processor 114 or 124 controls the communication unit to receive an advertisement message from the server device, controls the communication unit to transmit a scan request message to the server device and receive a scan response message as a response to the scan request from the server device, and controls the communication unit to transmit a connection request message to the server device to establish Bluetooth connection with the server device.

In addition, the processor 114 or 124 may control the communication unit to read or write data from or into the server device using an attribute protocol after the BLE connection is established through a connection procedure.

The memory 115 or 125 may include a read-only memory (ROM), a random access memory (RAM), a flash memory, a memory card, a storage medium, and/or another storage device.

The communication unit 118 or 127 may include a baseband circuit for processing a radio signal. When the embodiment is implemented in software, the above-described technique may be implemented as a module (process, function, etc.) for performing the above-described function. The module may be stored in a memory and executed by a processor.

The memory 115 or 125 may be within or outside the processor 114 or 124 and may be connected to the processor 114 or 124 by various well-known means.

The output unt 111 or 121 refers to a module for providing device status information and message exchange information to a user through a screen.

The power supply unit 113 or 123 refers to a module for supplying power required for an operation of each component by receiving external power and internal power under the control of the controller.

As discussed above, the BLE technology has a small duty cycle and may significantly reduce power consumption through a low data rate, so that the power supply unit may supply power for the operation of each component even with a low output power (10 mW (10 dBm) or less).

The input unit 112 or 122 refers to a module that provide a user input to the controller like a screen button so that the user may control an operation of the device.

FIG. 3 shows an example of a BLE topology.

Referring to FIG. 3, device A corresponds to a master in a piconet (piconet A, shaded portion) having device B and device C as slaves.

Here, the piconet refers to an aggregation of a plurality of devices occupying a shared physical channel in which one of a plurality of devices is a master and the other devices are connected to the master device.

The BLE slave does not share a common physical channel with the master. Each slave communicates with the master through a separate physical channel. There is another piconet (piconet F) having master device F and slave device G.

Device K is in scatternet K. Here, the scatternet refers to a group of piconets in which there is a connection between different piconets.

The device K is a master of device L and a slave of device M.

Device O is also in scatternet O. The device O is a slave of device P and a slave of device Q.

As shown in FIG. 3, there are five different device groups.
1. Device D is an advertiser and device A is an initiator (group D).
2. Device E is a scanner and device C is an advertiser (group C).
3. Device H is an advertiser and devices I and J are scanners (group H).
4. Device K is also an advertiser and device N is an initiator (group K).
5. Device R is an advertiser and device O is an initiator (group R).

Devices A and B use one BLE piconet physical channel. Devices A and C use another BLE piconet physical channel.

In group D, device D advertises using an advertising event connectable on an advertising physical channel, and device A is an initiator. Device A may establish a connection with device D and add a device to piconet A.

In group C, device C advertises on an advertising physical channel using a certain type of advertising event captured by scanner device E.

Group D and Group C may use different advertising physical channels or use different times to avoid a collision.

Piconet F has one physical channel. Devices F and G use one BLE piconet physical channel. Device F is a master and device G is a slave.

Group H has one physical channel. Devices H, I and J use one BLE advertising physical channel. Device H is an advertiser and devices I and J are scanners.

In scatternet K, devices K and L use one BLE piconet physical channel.

Devices K and M use another BLE piconet physical channel.

In group K, device K advertises using an advertising event connectable on an advertising physical channel, and device N is an initiator. Device N may form a connection with device K. Here, device K is a slave of two devices and also is a master of one device.

In scatternet O, devices O and P use one BLE piconet physical channel. Devices O and Q use another BLE piconet physical channel.

In group R, device R advertises using an advertising event connectable on an advertising physical channel, and device O is an initiator. Device O may form a connection with device R. Here, device a is a slave of two devices and also is a master of one device.

FIG. 4 is a diagram illustrating an example of a Bluetooth communication architecture to which the methods proposed in the present disclosure may be applied.

Referring to FIG. 4, (a) of FIG. 4 shows an example of a protocol stack of Bluetooth basic rate (BR)/enhanced data rate (EDR), and (b) shows a protocol stack of Bluetooth low energy (BLE).

Specifically, as shown in (a) of FIG. 4, the Bluetooth BR/EDR protocol stack includes an upper controller stack 10 and a lower host stack 20 with respect to a host controller interface (HCI) 18.

The host stack (or host module) 20 refers to a wireless transceiver module receiving a 2.4 GHz Bluetooth signal and hardware for transmitting or receiving a Bluetooth packet, and is connected to a Bluetooth module which is the controller stack 10 to control the Bluetooth module and perform an operation.

The host stack 20 may include a BR/EDR PHY layer 12, a BR/EDR baseband layer 14, and a link manager layer 16.

The BR/EDR PHY layer 12 is a layer for transmitting/receiving a 2.4 GHz radio signal and may transmit data by hopping 79 RF channels in the case of using Gaussian frequency shift Keying (GFSK) modulation.

The BR/EDR baseband layer 14 plays a role of transmitting a digital signal, selects a channel sequence which hops 1400 times per second, and transmits a 625-us length time slot for each channel.

The link manager layer 16 controls an overall operation (link setup, control, security) of the Bluetooth connection by utilizing a link manager protocol (LMP).

The link manager layer 16 may perform the following functions.
  ACL/SCO logical transport, logical link setup and control.
  Detach: It stops connection and informs a counterpart device of a reason for stopping.
  Power control and role switch.
  It performs security (authentication, pairing, encryption) functions.

The host controller interface layer 18 provides an interface between the host module and the controller module so that a host may provide commands and data to the controller, and allow the controller to provide events and data to the host.

The host stack (or host module) 20 includes a logical link control and adaptation protocol (L2CAP) 21, a security manager (SM) 22, an attribute protocol 23, a generic attribute profile (GATT) 24, a generic access profile (GAP) 25, and a BR/EDR profile 26.

The logical link control and adaptation protocol (L2CAP) 21 may provide one bidirectional channel for transmitting data to a specific protocol or profile.

The L2CAP 21 may multiplex various protocols, profiles, and the like provided by a higher layer of Bluetooth.

The L2CAP of the Bluetooth BR/EDR uses dynamic channel, supports protocol service multiplexer, retransmission, streaming mode, and provides segmentation, reassembly, per-channel flow control, and error control.

The security manager (SM) 22 is a protocol for authenticating a device and providing a key distribution.

The GATT 24 may be operable as a protocol describing how the attribute protocol 23 is used when services are configured. For example, the GATT 24 may be operable to define how ATT attributes are grouped together into services, and may be operable to describe features associated with the services.

Thus, the GATT 24 and the attribute protocol (ATT) 23 may use features to describe a state and services of a device, how features relate to each other, and how they are used.

The attribute protocol 23 and the profiles 26 define a service (profile) using Bluetooth BR/EDR and an application protocol for transmitting and receiving these data, and the GAP 25 defines a method of discovering and connecting a device and providing information to the user, and provide privacy.

As shown in (b) of FIG. 4, the Bluetooth LE protocol stack includes a controller stack 30 operable to process timing-critical wireless device interface and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 440, a generic attribute profile (GATT) 44, a generic access profile 25, and an LT profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

Bluetooth LE uses three fixed channels: one for a signaling channel, one for a security manager, and one for the attribute protocol.

Meanwhile, BR/EDR uses dynamic channels and supports protocol service multiplexer, retransmission, streaming mode, and the like.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

① Request and Response message: A request message is a message for requesting specific information from the client device to the server device, and the response message is a response message to the request message, which is a message transmitted from the server device to the client device.

② Command message: It is a message transmitted from the client device to the server device in order to indicate a command of a specific operation. The server device does not transmit a response with respect to the command message to the client device.

③ Notification message: It is a message transmitted from the server device to the client device in order to notify an event, or the like. The client device does not transmit a confirmation message with respect to the notification message to the server device.

④ Indication and confirmation message: It is a message transmitted from the server device to the client device in order to notify an event, or the like. Unlike the notification message, the client device transmits a confirmation message regarding the indication message to the server device.

In the present disclosure, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

① Battery: Battery information exchanging method

② Time: Time information exchanging method

③ FindMe: Provision of alarm service according to distance

④ Proximity: Battery information exchanging method

⑤ Time: Time information exchanging method

The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertising event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an supplemental information request or a connection request.

In contrast, directed advertising may make an supplemental information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertising events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related supplemental information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning

PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in the present disclosure.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (e.g., a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 based on a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present disclosure proposes a method in which a sensor measures and stores human activity using a GATT-based operation structure of the Bluetooth LE and a client retrieves the stored information from the sensor.

FIG. 6 is a flowchart illustrating a method for forming a connection using Bluetooth LE between devices.

As illustrated in FIG. 6, in order to establish a Bluetooth LE connection between a first device 300 and a second device 400, the first device 300 transmits an advertisement message to the second device (S6010).

As described above, the advertisement message is used for the first device 300 to provide information thereof to the other device using Bluetooth LE, and may include various information such as service information, user information, and the like provided by the device.

After checking the information included in the advertisement message transmitted from the first device 300, the second device 400 transmits a connection request message for requesting Bluetooth LE connection to the first device 300 (S6020), and the first device 300 and the second device 400 form a BLE connection (S6030).

The Bluetooth standard technology (e.g., Bluetooth Specification V4.0) is divided basic rate/enhanced data rate (BR/EDR) and low energy (LE) in core specification. Here, BR/EDR occupies the market dominant advantage of short-range wireless personal area network (WPAN) technology and is a wireless communication technology applied to many products.

Bluetooth Low Energy (BLE) is a technology introduced after the Bluetooth standard V4.0, which is designed to achieve higher energy efficiency than the existing Bluetooth BR/EDR.

The BLE performs communication using an industry-science-medical (ISM) frequency band (e.g., 2.4-2.4835 GHz) in the 2.4 GHz band. As described above, three advertising channels are used in BLE for device discovery. Here, two channels among the three designated primary advertising channels are present at a band edge. This will be described with reference to the following drawings. In the present disclosure, the three primary advertising channels are collectively referred to as a primary advertising channel set. The three advertising channels included in the primary advertising channel set may be previously set in a device using a Bluetooth protocol, and in the present disclosure, it is assumed that channel indexes are 37, 38, and 39, but the present disclosure is not limited thereto and the channel may have different channel index values.

FIG. 7 is a diagram illustrating a frequency band of a BLE advertising channel, as an embodiment to which the present disclosure may be applied.

Referring to FIG. 7, a total of 40 channels from CH0 to CH39 may be used in an operating frequency band of BLE, and a frequency band may be allocated to each channel.

As described above, in the BLE technology, a 2.4 GHz ISM band is used as an operating frequency, and specifically, a frequency band of 2400 to 2483.5 MHz may be used.

In this case, a frequency band may be allocated to each channel so that a k-th channel (here, k=0, . . . , 39) has a center frequency of 2402+k*2 MHz.

The primary advertising channel set 7010 may include CH37, CH38, and CH39 as illustrated in FIG. 7. The primary advertising channel set 7010 may be configured as a channel used only for advertising purposes.

Meanwhile, the data channel set 7020 represents the remaining data channels except the three advertising channels included in the primary advertising channel set 7010 among the entire channels, and the data channels represent channels used for transmitting and receiving data.

In the present disclosure, the data channel set 7020 may be referred to as an auxiliary advertising channel set. That is, in an embodiment to be described later, the remaining data channels except for the three advertising channels included in the primary advertising channel set 7010, that is, one or more data channels in the data channel set 7020, may be used as auxiliary advertising channels.

Here, CH37 and CH39 among the advertising channels of the primary advertising channel set 7010 are located at the edge of the BLE frequency band including 40 channels. Since some channels of the primary advertising channel set 7010 used only for advertisement or scanning are located at both edges of the entire frequency band, there may be a problem that efficiency of advertisement and device search due to interference may be degraded. This will be described with reference to the following drawings.

FIG. 8 is a diagram illustrating a frequency band of an advertising channel, as an embodiment to which the present disclosure may be applied.

Referring to FIG. 8, interference may occur by other communication technologies at an edge of the BLE frequency band using the 2.4 GHz ISM band. Specifically, in the vicinity of the edge including CH37, there is an auction plan of the band 2350-2390 MHz by Ofcom (British Broadcasting and Communications Commission) for LTE service.

In addition, near the edge including Ch39, a terrestrial low-power service band (2473-2495 MHz) has been proposed by Globalstar (US satellite telephone service provider) following the currently provided mobile satellite service band (2483.5-2495 MHz).

As described above, since interference may occur at the edge of the BLE frequency band by another communication technology, advertisement efficiency may be degraded when channels having channel indexes 37 and 39 located at the edges of the BLE frequency band in the primary advertising channel set 8010 are used.

Recently, in order to solve the problem, a method of additionally using an advertising channel other than the three existing advertising channels in addition to the primary advertising channel set 8010 is under discussion.

However, in the current BLE technology, advertisements using channels other than the primary advertising channel set (i.e., channels having channel indexes of 37, 38, and 39) are not possible. Therefore, in order to perform advertisement using four or more channels, a new link layer protocol and a new host controller interface (HCI) are required.

If it is necessary to modify the advertising channel set according to the presence of interference, it is necessary to share the corresponding information between the advertiser and the scanner, but the technology described above cannot be implemented if an advertising PDU defined in the existing BLE technology is used.

Accordingly, the present disclosure proposes a link layer protocol and a host controller interface to solve such a problem and to avoid interference occurring at the band edge.

By additionally including another advertising channel to THE primary advertising channel set used in the existing BLE technology, a degradation of advertisement/scanning efficiency may be prevented despite the presence of interference occurring at the edge of a BLE frequency band and reliability of discovery of a BLE device may be increased.

FIG. 9 is a diagram illustrating an advertising channel set that additionally uses an advertising channel, as an embodiment to which the present disclosure is applied.

In the related art BLE technology, an advertising event may be defined as shown in (a) of FIG. 9. An advertising event represents a series of one or more advertising packets transmitted from an advertiser through an advertising channel. The advertising packet may include an advertising channel PDU.

That is, as in the related art BLE technology, in the case of using three advertising channels, advertising packets may be transmitted in three advertising channels during an advertising event, and a time interval of 10 ms or less (i.e., advertising time) may be allocated for each advertising packet transmission.

In an embodiment of the present disclosure, when four advertising channels are used, an advertising event may be defined as shown in (b) of FIG. 9. The channel index added to the existing advertising channel set is defined as having a value of n. During the advertising event, an advertising packet may be transmitted in four advertising channels, and the same time interval of 10 ms or less as that of the existing case may be allocated to each advertising packet transmission.

In this case, a new generic access profile (GAP) timer may be set. This will be described with reference to the following drawings.

FIG. 10 is a diagram illustrating a generic access profile (GAP) timer according to the use of an additional advertising channel, as an embodiment to which the present disclosure is applied.

In an embodiment of the present disclosure, an advertising event and interval may be defined as shown in (a) of FIG. 10. As described above, the advertising event may include one or more advertisement times for transmitting an advertising packet.

In addition, a time allocated for the advertising event (i.e., T_advEvent) may include an advertisement interval (i.e., advInterval) in which an advertising packet is actually transmitted and an advertisement delay (i.e., advDelay) indicating a delay time that may occur in the process of transmitting the advertising packet).

In order to apply the method proposed in the present disclosure, a timer value for an advertisement or scanning of a GAP may be changed as shown in (b) of FIG. 10.

In detail, a minimum value of T_GAP (adv_fast_interval1_coded) indicating an advertisement interval from minimum to maximum in a GAP mode of the LE coded PHY may be changed to 120 ms. In the GAP mode of the LE 1M PHY, a minimum value of T_GAP (adv_fast_interval1) indicating an advertisement interval from minimum to maximum may be changed to 40 ms.

In addition, T_GAP (scan_fast_interval) indicating a scan interval of a discovery or connection establishment procedure in the LE 1M PHY may have a value of 40 ms to 80 ms. T_GAP (scan_fast_window_coded) indicating a scan window of the discovery or connection establishment procedure in the LE coded PHY may be changed to 80 ms. T_GAP (scan_fast_window) indicating a scan window of the discovery or connection establishment procedure in the LE 1M PHY may be changed to 80 ms.

In other words, as the advertising channels included in the advertising channel set increases from three channels to four channels, timer values defined in the GAP may be changed as shown in FIG. 10.

FIG. 11 is a diagram illustrating an advertising channel set additionally using an advertising channel, as an embodiment to which the present disclosure is applied.

Referring to FIG. 11, unlike the method described with reference to FIG. 9, advertising packets may be transmitted in four advertising channels within the same length as the advertising event length (or interval) in the existing BLE technology.

Therefore, since four advertisement times are allocated at a fixed length, each advertisement time may be reduced as shown in FIG. 11. Specifically, an interval of 7.5 ms or less may be allocated to each advertisement time.

Hereinafter, a method of configuring an advertising channel set by replacing a channel having interference with another channel, while maintaining the number of advertising channels to be equal to 3 which is the same as the existing case will be described.

FIG. 12 shows an example of an advertising event according to a modified advertising channel set, as an embodiment to which the present disclosure is applied.

Referring to FIG. 12, an existing advertising channel set and a modified (or updated) advertising channel set may equally include three advertising channels. Hereinafter, for convenience of description herein, the existing advertising channel set may be designated as a first advertising channel set (or a primary advertising channel set), and the modified (or updated) advertising channel set may be designated as a second advertising channel set (or an auxiliary advertising channel set).

The first advertising channel set may include three advertising channels (i.e., channels having channel indexes of 37, 38, and 39) (refer to the description in (a) of FIG. 9 above). When interference exists in any one of the advertising channels included in the first advertising channel, the channel in which the interference exists may be replaced (or modified) with another channel. The replacing channel may be any one channel of the data channel set, and a channel index may have a certain value (hereinafter, denoted as n) among index values of the remaining channels except for the advertising channels included in the first advertising channel set.

Referring to FIG. 12(a), it is assumed that interference exists (or occurs) in CH39. In this case, the second advertising channel set may be generated by replacing CH39 of the first advertising channel set with CHn.

Referring to FIG. 12(b), it is assumed that interference exists in CH37. In this case, the second advertising channel set may be generated by replacing CH37 of the first advertising channel set with CHn.

Referring to FIG. 12(c), it is assumed that interference exists in CH38. In this case, the second advertising channel set may be generated by replacing CH38 of the first advertising channel set with CHn.

Advertisement may be performed using the second advertising channel set modified (or updated) from the first advertising channel set. In this case, the advertisement may be performed, while maintaining the same length, advertisement time, or interval of the existing advertising event.

FIG. 13 shows an example of a method of performing an advertisement using four fixed channels, as an embodiment to which the present disclosure is applied.

Referring to FIG. 13, it is assumed that an existing advertising channel set includes four advertising channels instead of three advertising channels. In this embodiment, advertising packets may be transmitted and received between BLE devices using the four fixed channels.

In other words, in this embodiment, a new physical channel set (i.e., a primary advertising channel set) including four advertising channels may be defined. Channel indexes of the four advertising channels may have values of 37, 38, 39 and n, respectively.

In addition, a channel set including channels other than channels included in the newly defined physical channel set may configure a data channel set (or a reporting advertising channel set).

FIG. 13(a) shows an advertising channel map of an existing primary advertising channel set including three advertising channels. When four fixed advertising channels are used as a primary advertising channel set, a field indicating an added channel may be added to the advertising channel map as shown in FIG. 13(b).

An advertising channel map parameter illustrated in FIG. 13 may be included in an LE_Set_Advertising_Parameters Command among the HCI commands.

Also, the advertiser may perform advertisement using the new physical channel set. In this case, the method described above with reference to FIGS. 9 through 11 may be applied to a link layer operation in the same manner. The scanner may perform scanning during a scan window on the new physical channel set.

As described above, a primary advertising channel set may be configured using four advertising channels, and advertisement or scanning may be performed using the corresponding primary advertising channels. Hereinafter, a method of using a primary advertising channel including three advertising channels and applying a protected mode of an advertising channel according to the presence of interference, while using primary advertising channels including three advertising channels will be described.

In an embodiment of the present disclosure, a protected mode may be applied when interference exists, and a non-protected mode may be applied when interference does not exist. The BLE device may recognize whether there is interference in the existing advertising channel set in various ways. For example, the device may recognize whether the interference exists by using a higher level, an application, or the like, and may receive related information from the user.

If there is no interference, that is, in the non-protected mode, the advertiser may perform advertisement in the same manner as the existing case. If there is interference, that is, in the protected mode, the advertiser may perform advertisement on four advertising channels (new advertising channel is added) or three advertising channels (channel having interference is replaced).

In addition, when the protected mode is applied by determining whether the protected mode is to be applied by the advertiser, the scanner may perform scanning using four channels. A new advertising channel PDU may be used when the scanner determines whether to apply the protected mode from the advertiser. Details thereof will be described later.

In the case of using four advertising channels in the protected mode, the scanner is not required to know which channel has interference, and advertisement/scanning may be performed advantageously using the four predetermined channels. Meanwhile, advertisement efficiency may be lowered due to continuous use of the channel in which interference exists. In this case, the advertiser and the scanner need to share whether to use the protected mode.

When three advertising channels are used in the protected mode, since advertisement/scanning is not performed on the channel in which interference exists, a discovery time or discovery efficiency may increase. Meanwhile, the advertiser and scanner need to share which channel is to be discarded or which channel has interference. Even in this case, the advertiser and the scanner need to share whether the protected mode is to be used or not.

FIG. 14 is a flowchart illustrating a method of modifying an advertising channel set according to whether interference exists in an advertising channel, as an embodiment to which the present disclosure is applied.

Referring to FIG. 14, whether to apply the protected mode may be indicated by the advertiser, i.e., the second device 400.

In case where interference is detected, a host of the second device 400 transmits an LE Set Advertising Protection Enable command to a link layer (LL) of the second device 400 in order to apply the protected mode (S14010). The LE Set Advertising Protection Enable command may have a size of one octet, and if the value is 0x00, it may indicate deactivation of the protected mode, that is, the non-protected mode, and if the value is 0x01, it may indicate activation of the protected mode.

The LL of the second device 400 may transmit a command completion message indicating that the command is successfully completed to the host of the second device 400 (S14020).

The LL of the second device 400 transmits an ADV CH UPDATE IND indicating the updating (or modification) of the advertising channels to an LL of the first device 300 (S14030). In this case, the LL of the second device 400 may transmit the ADV CH UPDATE IND a plurality of times during a preset advertising channel update interval.

The LL of the first device 300 transmits a message indicating that the ADV CH UPDATE IND PDU has been received to the host of the first device 300 (S14040). This may trigger the protected mode.

The host of the first device 300 indicates activation (or application) of the protected mode and transmits an LE Set Advertising Protection Enable command to the LL of the first device 300 (S14050). The LL of the first device 300 may transmit a command completion message indicating that the command has been successfully completed to the host of the first device 300 (S14060).

Thereafter, the second device 400 may perform advertisement by using the updated advertising channel set, and the first device 300 may perform scanning by using the updated advertising channel set.

FIG. 15 is a diagram illustrating a format of an advertising packet indicating whether to apply a protected mode of an advertising channel, as an embodiment to which the present disclosure is applied.

The LL of the second device 400 may use an advertising channel PDU as shown in FIG. 15 to inform the LL of the first device 300 as to whether to use the protected mode. As described above, the advertising channel PDU may be transmitted a plurality of times, and in this case, the advertising channel PDU may be transmitted for a predetermined interval.

The advertising channel PDU indicating whether to use the protected mode may include a payload having the format of FIG. 15(*a*). Specifically, the payload may include an AdvA field indicating an address of the advertiser and an AdvChSet field indicating the advertising channel set.

In addition, the AdvChSet field may have a format shown in FIG. 15(*b*). Specifically, when the AdvChSet field is 0x00, advertisement may be performed using three channels included in the existing primary advertising channel set. If the AdvChSet field is 0x01, advertisement may be performed using a total of four channels including an additional channel having a channel index of n in the three channels included in the existing primary advertising channel set.

In the above, the method of setting the protected mode on a connectionless basis has been described. Hereinafter, a method of setting a protected mode on a connection basis will be described.

FIG. 16 is a flowchart illustrating a method of modifying an advertising channel set according to whether interference exists in an advertising channel, as an embodiment to which the present disclosure is applied.

The first device 300 forms a BLE connection with the second device 400. In this case, the method described above with reference to FIG. 6 may be applied.

When interference is detected, the host of the first device 300 transmits an LE Set Advertising Protection Enable command to the LL of the first device 300 in order to apply the protected mode (S16010). The LE Set Advertising Protection Enable command may have a size of 1 octet, and when the LE Set Advertising Protection Enable command value is 0x00, it may indicate deactivation of the protected mode, that is, the non-protected mode (or a default mode), and when the LE Set Advertising Protection Enable command value is 0x01, it may indicate activation of the protected mode.

The LL of the first device 300 may transmit a command completion message indicating that the command has been successfully completed to the host of the first device 300 (S16020).

The LL of the first device 300 transmits an ADV CH UPDATE IND indicating updating (or modification) of the advertising channels to the LL of the second device 400 (S16030). In this case, the LL of the first device 300 may transmit the ADV CH UPDATE IND a plurality of times for a preset advertising channel update interval.

The LL of the second device 400 transmits a message indicating that the ADV CH UPDATE IND PDU has been received to the host of the second device 400 (S16040). This may trigger the protected mode.

The host of the second device 400 indicates activation (or application) of the protected mode and transmits an LE Set Advertising Protection Enable command to the LL of the second device 400 (S16050). The LL of the second device 400 may transmit a command completion message indicating that the command has been successfully completed to the host of the second device 400 (S16060).

Thereafter, the second device 400 may perform advertisement using the updated advertising channel set, and the first device 300 may perform scanning using the updated advertising channel set.

FIG. 17 is a diagram illustrating an example of a format of a control message indicating whether to apply a protected mode of an advertising channel, as an embodiment to which the present disclosure is applied.

The first device 300 may use a link layer control PDU as shown in FIG. 17 to indicate whether to use the protected mode to the second device 400. As described above, the control PDU may be transmitted a plurality of times, in which case the control PDU may be transmitted for a predetermined interval.

The link layer control PDU indicating whether to use the protected mode may include a payload having the format of FIG. 17(*a*). Specifically, the payload may include an Opcode field indicating an operation code and a CtrData field indicating control data.

In addition, the CtrData field may have a format shown in FIG. 17(*b*). Specifically, when the CtrData field is 0x00, advertisement may be performed using the three channels included in the existing primary advertising channel set. If the CtrData field is 0x01, advertisement may be performed using a total of four channels including the additional channel n in the three channels included in the existing primary advertising channel set.

Meanwhile, prior to transmitting a control message indicating the application of the protected mode, information about an available advertising channel set or advertising channels may be exchanged by performing a negotiation procedure between the first device 300 and the second device 400. This will be described with reference to the following drawings.

FIG. 18 is a flowchart illustrating a method of modifying an advertising channel set through a negotiation procedure according to whether interference exists in an advertising channel, as an embodiment to which the present disclosure is applied.

The first device 300 forms a BLE connection with the second device 400. In this case, the method described above with reference to FIG. 6 may be applied.

When interference is detected, the host of the first device 300 transmits an LE SetAdvertising Protection Enable command to the LL of the first device 300 in order to apply the protected mode (S18010). The LE Set Advertising Protection Enable command may have a size of 1 octet, and when the LE Set Advertising Protection Enable command value is 0x00, it may indicate deactivation of the protected mode, that is, the non-protected mode (or default mode), and when the LE SetAdvertising Protection Enable command value is 0x01, it may indicate activation of the protected mode.

The LL of the first device 300 may transmit a command completion message indicating that the command has been successfully completed to the host of the first device 300 (S18020).

The LL of the first device 300 transmits an advertising channel request message for requesting information related to an available advertising channel set (or available auxiliary advertising channels) to the LL of the second device (S18030). The LL of the second device transmits an advertising channel response message including information related to an available advertising channel set or an available auxiliary advertising channel in the second device (S18040). Here, the auxiliary advertising channel indicates an advertising channel added to the primary advertising channel set.

ADV CH UPDATE IND indicating updating (or modification) of the advertising channel is transmitted to the LL of the second device 400 (S18050). In this case, the ADV CH UPDATE IND may be a control message determined based on the information received in operation S18040.

The LL of the second device 400 transmits a message indicating that the ADV CH UPDATE IND PDU has been received to the host of the second device 400 (S18060). This may trigger the protected mode.

The host of the second device 400 indicates activation (or application) of the protected mode and transmits an LE Set Advertising Protection Enable command to the LL of the second device 400 (S18070). The LL of the second device 400 may transmit a command completion message indicating that the command has been successfully completed to the host of the second device 400 (S18080).

Thereafter, the second device 400 may perform advertisement using the updated advertising channel set, and the first device 300 may perform scanning using the updated advertising channel set.

FIG. 19 is a diagram illustrating a format of a control message indicating whether to apply a protected mode of an advertising channel, as an embodiment to which the present disclosure is applied.

The first device 300 may use a link layer control PDU as shown in FIG. 19 to indicate to the second device 400 as to whether to use the protected mode.

The link layer control PDU indicating whether to use the protected mode may include a payload having the format of FIG. 19(*a*). Specifically, the payload may include an Opcode field indicating an operation code and a CtrData field indicating control data.

In this case, the CtrData field may have a format shown in FIG. 19(*b*). Specifically, when the CtrData field is 0, advertisement may be performed using the three channels included in the existing primary advertising channel set. If the CtrData field is 1, advertisement may be performed using a second advertising channel set including an auxiliary advertising channel having a channel index n in addition to the three channels included in the existing primary advertising channel set. If the CtrData field is 2, advertisement may be performed using a second advertising channel set in which a channel in which interference exists among the three channels included in the existing primary advertising channel set is replaced with the auxiliary advertising channel having the channel index n.

As described above, the value of the CtrData field may be determined based on the available advertising channel set or available auxiliary advertising channel information exchanged in the negotiation procedure with the second device 400 (S18030 and S18040 in FIG. 18 above).

In addition, the format illustrated in FIG. 19(*b*) may be a format of control data included in a response message transmitted from the second device 400 in the negotiation procedure.

Hereinafter, an embodiment of applying an advertising channel protection method based on three channels will be described. In the present embodiment, in the non-protected mode where there is no interference, advertisement/scanning may be performed in the existing primary advertising channel set. In the case of the protected mode in which interference exists, advertisement/scanning may be performed by using an auxiliary advertising channel set including three advertising channels by adding a new auxiliary advertising channel instead of the advertising channel including a strong interference signal.

FIG. 20 is a flowchart illustrating a method of modifying an advertising channel set according to whether interference exists in an advertising channel, as an embodiment to which the present disclosure is applied.

If interference is detected, the host of the second device 400 transmits an LE Set Advertising Protection command to the LL of the second device 400 in order to apply the protected mode (S20010). The LE Set Advertising Protection command may have a size of 1 octet. When the LE Set Advertising Protection command has a value of 0x00 it may indicate deactivation of the protected mode, that is, the non-protected mode, and when the LE Set Advertising Protection command has a value of 0x01, it may indicate activation of the protected mode. In addition, the LE Set Advertising Protection command may include discarded channel (i.e., channel with strong interference) information and/or added channel (i.e., auxiliary advertising channel) information.

Subsequent steps S20020, S20030, S20040, S20050, and S20060 may be performed in the same manner as steps S14020, S14030, S14040, S14050, and S14060 of FIG. 14 described above.

Thereafter, the second device 400 may perform advertisement using the updated advertising channel set, and the first device 300 may perform scanning using the updated advertising channel set.

FIG. 21 is a diagram illustrating an example of a format of an advertising packet indicating whether to apply a protected mode of an advertising channel, as an embodiment to which the present disclosure is applied.

The LL of the second device 400 may use an advertising channel PDU as shown in FIG. 21 to inform the LL of the first device 300 as to whether to use the protected mode. As described above, the advertising channel PDU may be transmitted a plurality of times, and in this case, it may be transmitted for a predetermined interval.

The advertising channel PDU indicating whether to use the protected mode may include a payload having the format of FIG. 21(*a*). Specifically, the payload may include an AdvA field indicating an address of an advertiser, a DropAdvCh field indicating a dropped advertising channel, and an AddAdvCh field indicating an added advertising channel.

The DropAdvCh field may have a format shown in FIG. 21(*b*). Specifically, a value of the DropAdvCh field may indicate an index of a replaced advertising channel. The AddAdvCh field may have a format shown in FIG. 21(*c*). Specifically, a value of the AddAdvCh field may indicate an index of an added advertising channel.

In the above, the method of setting the protected mode on a connectionless basis. Hereinafter, a method of setting a protected mode on a connection basis will be described.

FIG. 22 is a flowchart illustrating a method of modifying an advertising channel set according to whether an interference exists in an advertising channel, as an embodiment to which the present disclosure is applied.

The first device 300 forms a BLE connection with the second device 400. In this case, the method described above with reference to FIG. 6 may be applied.

When interference is detected, the host of the first device 300 transmits an LE SetAdvertising Protection Enable command to the LL of the first device 300 in order to apply the protected mode (S22010). The LE Set Advertising Protection Enable command may have a size of 1 octet, and when a value of the LE Set Advertising Protection Enable command value is 0x00, it may indicate deactivation of the protected mode, that is, the non-protected mode (or default mode), and when the value of the LE Set Advertising Protection Enable command value is 0x01, it may indicate activation of the protected mode.

The LL of the first device 300 may transmit a command completion message indicating that the command has been successfully completed to the host of the first device 300 (S22020).

The LL of the first device 300 transmits an ADV CH UPDATE IND indicating updating (or modification) of the advertising channel to the LL of the second device 400 (S22030).

The LL of the second device 400 transmits a message indicating that the ADV CH UPDATE IND PDU has been received to the host of the second device 400 (S22040). This may trigger the protected mode.

The host of the second device 400 indicates activation (or application) of the protected mode and transmits an LE Set Advertising Protection Enable command to the LL of the second device 400 (S22050). The LL of the second device 400 may transmit a command completion message indicating that the command has been successfully completed to the host of the second device 400 (S22060).

Thereafter, the second device 400 may perform advertisement by using the updated advertising channel set, and the first device 300 may perform scanning by using the updated advertising channel set.

In this case, the link layer control message transmitted in step S22030 may include the payload of FIG. 21(a). The dropped channel information or the added channel information included in the payload will be described with reference to the following drawings.

FIG. 23 is a diagram illustrating an example of a format of control information including advertising channel information related to application of a protected mode of an advertising channel, as an embodiment to which the present disclosure is applied.

The information related to the advertising channel included in the link layer control PDU indicating updating (or modification) of the advertising channel may have a format as shown in FIG. 23.

In other words, the link layer control PDU indicating updating of the advertising channel may include index information of a channel dropped and index information of a channel added due to the presence of interference.

Subsequently, the first device 300 and the second device 400 may perform advertisement/scanning by using the updated second advertising channel set including the auxiliary advertising channel instead of the channel in which the interference exists.

Meanwhile, prior to transmitting the control message indicating the application of the protected mode, information on the available advertising channel set or advertising channels may be exchanged by performing a negotiation procedure between the first device 300 and the second device 400.

FIG. 24 is a flowchart illustrating a method of modifying an advertising channel set through a negotiation procedure according to whether interference exists in an advertising channel, as an embodiment to which the present disclosure is applied.

The first device 300 forms a BLE connection with the second device 400. In this case, the method described above with reference to FIG. 6 may be applied.

When interference is detected, the host of the first device 300 transmits an LE SetAdvertising Protection Enable command to the LL of the first device 300 in order to apply the protected mode (S24010). The LE Set Advertising Protection Enable command may have a size of 1 octet, and when the LE Set Advertising Protection Enable command value is 0x00, it may indicate deactivation of the protected mode, that is, the non-protected mode (or the default mode), and when the LE Set Advertising Protection Enable command value is 0x01, it may indicate activation of the protected mode.

The LL of the first device 300 may transmit a command completion message indicating that the command has been successfully completed to the host of the first device 300 (S24020).

The LL of the first device 300 transmits an advertising channel request message for requesting information related to an available advertising channel set (or available auxiliary advertising channel) to the LL of the second device (S24030). The LL of the second device transmits an advertising channel response message including information related to the available advertising channel set or available auxiliary advertising channel in the second device (S24040). Here, the auxiliary advertising channel indicates an advertising channel added to the primary advertising channel set.

ADV CH UPDATE IND indicating updating (or modification) of the advertising channel is transmitted to the LL of the second device 400 (S24050). Here, the ADV CH UPDATE IND may be a control message determined based on the information received in step S24040.

The LL of the second device 400 transmits a message indicating that the ADV CH UPDATE IND PDU has been received to the host of the second device 400 (S24060). This may trigger the protected mode.

The host of the second device 400 indicates activation (or application) of the protected mode and transmits an LE Set Advertising Protection Enable command to the LL of the second device 400 (S24070). The LL of the second device 400 may transmit a command completion message indicating that the command has been successfully completed to the host of the second device 400 (S24080).

Thereafter, the second device 400 may perform advertisement using the updated advertising channel set, and the first device 300 may perform scanning using the updated advertising channel set. The first device 300 and the second device 400 may perform advertisement/scanning by using the updated second advertising channel set including the auxiliary advertising channel instead of the channel having interference.

FIG. 25 is a diagram illustrating a method of protecting an advertising channel in a mesh network, as an embodiment to which the present disclosure is applied.

Referring to FIG. 25, a plurality of BLE devices may configure a mesh network. The BLE devices constituting the mesh network transmit and receive a mesh packet through an advertising bearer.

In the case of using the protected mode for protecting an advertising channel in such a mesh network, the number of channels that the BLE device needs to scan increases, which may cause a problem that a probability of receiving a mesh packet quickly is lowered.

Therefore, the present disclosure proposes a method in which a node which grasps (or recognizes) an interference state of a BLE advertising channel among nodes constituting a mesh network shares it with the entire mesh network to perform advertising channel protection without a separate HCI command. The node which grasps the interference state of the BLE advertising channel may inform the mesh network to operate in the non-protected mode when interference is low and to operate in the protected mode when interference is high.

FIG. 26 is a diagram illustrating an example of a method of releasing protection of an advertising channel in a mesh network, as an embodiment to which the present disclosure is applied.

Referring to FIG. 26, it is assumed that the BLE devices S1 to S9 form a mesh network and a protected mode is set.

The S3 device constituting one node of the mesh network performs a procedure of checking, with the external device, a degree of interference existing in an advertising channel set (S26010).

As a result of checking in step S26010, if there is no interference in the existing advertising channel set or if the interference is smaller than a predetermined value, the S3 device sends an ADV CH UPDATE IND indicating modification of the advertising channel set to the other devices of the mesh network (S26020).

In this case, the S3 device may transmit the ADV CH UPDATE IND a plurality of times during preset advertising channel update interval. This may cause the protected mode to be released and the mesh network to be switched to a non-protected mode. In the non-protected mode, advertisement/scanning may be performed using the existing primary advertising channel set.

FIGS. 27 and 28 illustrate a method of applying a protected mode of an advertising channel according to an interference environment for each region in the case of establishing a wide area mesh network, as an embodiment to which the present disclosure is applied.

Referring to FIG. 27, when a wide area mesh network is established, an interference environment experienced by a mesh node may vary depending on an area. In this case, the protected mode needs to be applied differently according to the area.

For example, if interference exists in an advertising channel only in one of a first area 27010 and a second area 27020 included in the wide area mesh network, the protected mode may be applied only to the area where interference exists, thereby effectively protecting the advertising channel in the mesh network.

In an embodiment of the present disclosure, by limiting the number of hops available for transmission of a PDU indicating whether a protected mode is applied from a triggering node, the same mode may be applied only to nodes in areas having a similar interference environment. Here, the triggering node indicates a node that initially transmits an indication message indicating modification of the protected mode.

In other words, the triggering node that checks the interference state and starts modification of the protected mode may transmit an ADV CH UPDATE IND indicating updating of the advertising channel. The ADV CH UPDATE_IND may be a link layer advertising channel PDU defined in a mesh network.

In this case, the ADV CH UPDATE IND message may include a payload as shown in FIG. 28.

In particular, in the case of applying a method using the 4 channel-based advertising channel set, a field indicating a maximum hop count may be added to the payload as shown in FIG. 28(a).

In addition, in the case of applying a method of using a 3 channel-based advertising channel set, a field indicating a maximum hop count may be added to the payload as shown in FIG. 28(b).

After receiving the corresponding PDU at each node, relay may be performed by reducing the hop count field of the payload by 1.

FIGS. 29 and 30 are flowcharts illustrating a method of modifying a scanning mode according to the presence or absence of interference, as an embodiment to which the present disclosure may be applied.

In an embodiment of the present disclosure, the scanner may activate the protected mode if there is interference and deactivate the protected mode if there is no interference, regardless of state of the advertiser. If the advertiser device is a new device, it may use four channels, and if the advertiser device is a legacy device, it may use three channels.

Referring to FIG. 29, a method in which the first device 300 releases a protected mode according to a state of interference on the assumption that the protected mode is previously activated. Also, it is assumed that advertisement/scanning is performed using a total of four advertising channels including an auxiliary advertising channel in the primary advertising channel set in the protected mode.

The host of the first device 300 recognizes that there is no interference in the primary advertising channel set, and sends an LE Set Advertising Protection command to the LL of the first device 300 to indicate deactivation of the protected mode. (S29010). The LL of the first device 300 transmits a completion message including information related to the result of the command to the host of the first device 300 (S29020). The LE Set Advertising Protection command, which is an HCI command, may have the format shown in FIG. 30.

Specifically, the LE Set Advertising Protection command may include a command parameter. The command parameter indicates a parameter instructing setting or release the advertisement protected mode. The LE Set Advertising Protection command may include a return parameter. The return parameter may indicate a command processing result state or a current advertisement protected mode state.

When the command parameter indicates the use of the protected mode, the LL of the first device 300 may perform four channel scanning. When the command parameter indicates that the protected mode is not used, the LL of the first device 300 may perform three-channel scanning.

That is, the LL of the second device 400 performs advertisement, and the LL of the first device 300 performs scanning on three channels (i.e., a primary advertising channel) (S29030). After scanning the advertisement message, the LL of the first device 300 transmits a scan request message requesting supplemental information (S29040). The LL of the second device 400 transmits a scan response message including supplemental information in response to the scan request message (S29050).

The LL of the first device 300 transmits an LE advertisement report message including information related to the advertisement result to the host of the first device 300 (S29060).

FIG. 31 is a diagram illustrating an operation between a new device and a legacy device when a protected mode of an advertising channel is applied, as an embodiment to which the present disclosure may be applied.

Referring to FIG. 31(a), it is assumed that an advertiser device is a new device and a scanner device is a legacy device. In this case, when the four-channel-based dynamic advertising method described above with reference to FIGS. 14 to 19 is applied, the advertiser may increase the number of advertising channel sets to four after the occurrence of interference to perform advertisement.

Meanwhile, since the scanner scans only the channels having channel indexes 37, 38, and 39, which are the primary advertising channels, when interference exists at a BLE band edge (e.g., channel 37), the scanner may perform scanning using an existing advertising channel including an interfered channel.

Referring to FIG. 31(b), it is assumed that the advertiser device is a legacy device and a scanner device. Here, the advertiser instructs whether to apply the protected mode for each extended advertising event. In contrast, the scanner may perform a four-channel-based fixed scanning operation.

FIG. 32 is a diagram illustrating a method of applying a protected mode of an advertising channel, as an embodiment to which the present disclosure may be applied.

Referring to FIG. 32(a), a master device may use the protected mode in a BLE connection state with a slave device. Specifically, after the master device is connected to the slave device at an initial state, the master device may transmit a protected mode activation message for applying the dynamic advertising described above with reference to FIGS. 14 to 24 in the connected state.

The slave device transmits an available (or preferred) advertising channel set (or available advertising channel) to the master device, and then updates the advertising channel set based on information received from the master device.

Referring to FIG. 32(b), after the BLE connection is released, the master device and the slave device may perform advertisement and scanning using the updated advertising channel set in the protected mode. This effectively reduces a discovery time of a peer device after the advertising channel is updated.

FIG. 33 is a diagram illustrating a method of periodically indicating whether a protected mode of an advertising channel is applied, as an embodiment to which the present disclosure may be applied.

Referring to FIG. 33, the advertiser may periodically inform about the protected mode at each extended advertising event. The advertiser may transmit a packet indicating whether to apply the protected mode in the primary advertising channel when initiating the extended advertising event. Thereafter, an indication message related to an extended advertising event in the updated advertising channel set, that is, the reporting advertising channel set, may be transmitted according to whether the protected mode is applied.

The scanner may perform scanning after maintaining or changing the protected mode through the advertising channel PDU indicating updating of the received advertising channel.

FIG. 34 is a diagram illustrating a method for periodically indicating whether to apply a protected mode of an advertising channel, as an embodiment to which the present disclosure may be applied.

Referring to FIG. 34, an Angle of Arrival (AoA)/AriD of Departure (AoD) may be performed by transmitting supplemental information for direct finding through extended advertisement.

If reception efficiency of the above-described ADV EXT IND PDU is decreased due to interference present in the 2.4 GHz BLE band, efficiency of indoor positioning or asset tracking may be reduced. However, in the case of applying the advertising channel protection method proposed in the present disclosure, it is possible to improve transmission efficiency of advertisement and transmission efficiency of supplemental information of the extended advertising event through the updated advertising channel set.

FIG. 35 is a diagram illustrating a method of applying a protected mode of an advertising channel according to an interference environment for each region in the case of establishing a wide area mesh network, as an embodiment to which the present disclosure may be applied.

Referring to FIG. 35, when a wide area mesh network is established, an interference environment experienced by a mesh node may vary according to an area. In this case, the protected mode needs to be applied differently according to the area.

For example, if interference exists in an advertising channel only in one of a first area 35010 and a second area 35020 included in the wide area mesh network, the protected mode may be applied only to an area where interference exists, thereby effectively protecting the advertising channel in the mesh network.

As described above with reference to FIG. 27, it is possible to manage the advertising channel set for each area based on a hop count. In this case, a message indicating updating of different advertising channel sets may be transmitted to a node existing at the edge of each area.

For example, when a node S5 existing at an area edge of the first area 3510 and the second area 3520 receives different ADV CH UPDATE IND PDUs, the node S5 may transfer a packet to a next hole using a legacy advertising channel set without modifying the protected mode.

FIG. 36 illustrates an example of a method for protecting an advertising channel, as an embodiment to which the present disclosure is applied.

Referring to FIG. 36, the first device recognizes an advertising channel in which interference exists among three advertising channels constituting a first advertising channel set (S36010).

When the first device recognizes an advertising channel in which interference exists in step S3601, the first device transmits a command message indicating application of the protected mode to the second device (S36020).

Here, the protected mode indicates a mode for transmitting and receiving a message using a second advertising channel set updated from the first advertising channel set in a non-connection state.

The first device receives an advertisement message from the second device through the second advertising channel set (S36030).

As described above, the second advertising channel set may be updated to additionally include at least one advertising channel in addition to the three advertising channels constituting the first advertising channel set.

In this case, the control message may include at least one of operation code information indicating updating of the first advertising channel set, index information of an additionally included advertising channel, or information on the number of advertising channels included in the second advertising channel set.

In addition, as described above, the second advertising channel set may be updated to replace the advertising channel having interference with a specific channel among data channels used for transmitting and receiving data.

In this case, the control message may include at least one of operation code information indicating updating of the first advertising channel set, index information of an advertising channel in which interference exists, or index information of the replacing specific channel.

In addition, as described above, the first device may transmit a request message for requesting information related to updating of the first advertising channel set to the second device. The first device may receive a response message including information related to the updating in response to the request message from the second device.

In addition, the information related to the updating may include information related to an auxiliary advertising channel available in the second device or information related to an advertising channel set available in the second device.

In addition, as described above, the first device and the second device may configure a mesh network.

In this case, the control message may include at least one of operation code information indicating updating of the first advertising channel set, index information of an advertising channel having interference, index information of an advertising channel added to the first advertising channel set, the number information of the advertising channel included in the second advertising channel set, or hop count information for limiting a maximum hop number.

In addition, the control message may be dropped or transmitted to one or more adjacent devices by the second device according to the hop count value.

The present invention descried above is not limited to the above-described embodiments and the accompanying drawings because those having ordinary skill in the technical field to which the present invention pertains can make various replacements, variations and modifications within the range which does not depart from the technical spirit of the invention.

INDUSTRIAL APPLICABILITY

The present disclosure relates to a method and apparatus for discovering an adjacent device using Bluetooth low energy (LE). In particular, the method performed by a first device includes: recognizing an advertising channel in which interference exists among three advertising channels constituting a first advertising channel set; transmitting a control message instructing application of a protected mode to a second device, when the advertising channel in which interference exists is recognized, the protected mode indicating a mode for transmitting and receiving a message using a second advertising channel set updated from the first advertising channel set in a non-connection state; and receiving an advertisement message from the second device through the second advertising channel set.

The invention claimed is:

1. A method for discovering an adjacent device in a wireless communication system using Bluetooth low energy (LE), which is performed by a first device, the method comprising:
   recognizing an advertising channel in which interference exists among three advertising channels constituting a first advertising channel set;
   transmitting a control message instructing application of a protected mode to a second device, based on that the advertising channel in which interference exists is recognized, the protected mode indicating a mode for transmitting and receiving a message using a second advertising channel set updated from the first advertising channel set in a non-connection state; and
   receiving an advertisement message from the second device through the second advertising channel set,
   wherein the control message comprises operation code information instructing updating of the first advertising channel set.

2. The method of claim 1, wherein
the second advertising channel set is updated to additionally include at least one advertising channel in addition to the three advertising channels constituting the first advertising channel set.

3. The method of claim 2, wherein
the control message further comprises at least one of index information of the additionally included advertising channel, or number information of the advertising channels included in the second advertising channel set.

4. The method of claim 1, wherein
the second advertising channel set is updated to replace the advertising channel in which interference exists with a specific channel among data channels used for transmitting and receiving data.

5. The method of claim 4, wherein
the control message further comprises at least one of index information of the advertising channel in which interference exists, or index information of the replacing specific channel.

6. The method of claim 1, further comprising:
transmitting a request message requesting information related to updating of the first advertising channel set to the second device; and
receiving a response message including the information related to updating in response to the request message from the second device.

7. The method of claim 6, wherein
the information related to updating comprises information related to an auxiliary advertising channel available in the second device or information related to an advertising channel set available in the second device.

8. The method of claim 1, wherein
the first device and the second device form a mesh network.

9. The method of claim 8, wherein
the control message further comprises at least one of index information of the advertising channel in which interference exists, an index information of an advertising channel added to the first advertising channel set, number information of the advertising channels included in the second advertising channel set, or hop count information for limiting a maximum hop number.

10. The method of claim 9, wherein
the control message is dropped or transmitted to one or more adjacent devices by the second device according to the hop count value.

11. A device for discovering an adjacent device in a wireless communication system using Bluetooth low energy (LE), the device, as a first device, comprising:
   a communication unit configured to communicate with an external device wirelessly or wiredly; and
   a processor functionally connected to the communication unit,
   wherein the processor
   recognizes an advertising channel in which interference exists among three advertising channels constituting a first advertising channel set,
   transmits a control message instructing application of a protected mode to a second device, based on that the advertising channel in which interference exists is recognized, the protected mode indicating a mode for transmitting and receiving a message using a second advertising channel set updated from the first advertising channel set in a non-connection state, and
   receives an advertisement message from the second device through the second advertising channel set,
   wherein the control message comprises operation code information instructing updating of the first advertising channel set.

12. The device of claim 11, wherein
the second advertising channel set is updated to additionally include at least one advertising channel in addition to the three advertising channels constituting the first advertising channel set.

13. The device of claim 12, wherein
the control message further comprises at least one of index information of the additionally included advertising channel, or number information of the advertising channels included in the second advertising channel set.

14. The device of claim 11, wherein
the second advertising channel set is updated to replace the advertising channel in which interference exists with a specific channel among data channels used for transmitting and receiving data.

15. The device of claim 14, wherein
the control message further comprises at least one of index information of the advertising channel in which interference exists, or index information of the replacing specific channel.

* * * * *